United States Patent
Nakamura et al.

(10) Patent No.: US 9,945,477 B2
(45) Date of Patent: Apr. 17, 2018

(54) SHIFT DRUM ANGLE DETECTING DEVICE FOR TRANSMISSION

(71) Applicant: HONDA MOTOR CO., LTD., Tokyo (JP)

(72) Inventors: Kazuhiko Nakamura, Wako (JP); Hiroyuki Kojima, Wako (JP); Yoshihisa Kanno, Wako (JP); Hiroshi Takamoto, Wako (JP); Yoshiaki Tsukada, Wako (JP); Takashi Ozeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 14/864,779

(22) Filed: Sep. 24, 2015

(65) Prior Publication Data

US 2016/0091089 A1    Mar. 31, 2016

(30) Foreign Application Priority Data

Sep. 30, 2014 (JP) .................................. 2014-199941

(51) Int. Cl.
| | |
|---|---|
| *F16H 59/02* | (2006.01) |
| *B60K 20/00* | (2006.01) |
| *F16H 61/32* | (2006.01) |
| *F16H 63/18* | (2006.01) |
| *F16H 63/16* | (2006.01) |
| *F16H 63/42* | (2006.01) |

(52) U.S. Cl.
CPC ............. *F16H 61/32* (2013.01); *F16H 63/16* (2013.01); *F16H 63/18* (2013.01); *F16H 63/42* (2013.01)

(58) Field of Classification Search
CPC .......... F16H 37/021; F16H 2003/0931; F16H 59/044
USPC ..................... 74/325, 337.5, 473.1
See application file for complete search history.

(56) References Cited

U.S. PATENT DOCUMENTS

| | | | | | |
|---|---|---|---|---|---|
| 4,409,858 | A | * | 10/1983 | Lasoen | F16H 3/093 |
| | | | | | 74/337.5 |
| 4,723,643 | A | * | 2/1988 | Numazawa | B60K 17/02 |
| | | | | | 192/3.58 |
| 4,846,010 | A | * | 7/1989 | Fujikawa | B60K 17/3467 |
| | | | | | 180/249 |

(Continued)

FOREIGN PATENT DOCUMENTS

JP   2009-156375   7/2009

*Primary Examiner* — Ha Dinh Ho
(74) *Attorney, Agent, or Firm* — Mori & Ward, LLP

(57) ABSTRACT

A shift drum angle detecting device for a transmission includes shift forks, a shift drum, a first sensor shaft, a first angle sensor, a speed increasing mechanism, and a second angle sensor. The first angle sensor is to detect a rotational angle of the first sensor shaft to output a first output value based on the rotational angle. The speed increasing mechanism includes a speed increasing drive member, a speed increasing driven member, and a second sensor shaft. The second angle sensor is provided to the second sensor shaft to detect a rotational angle of the second sensor shaft and to output a second output value based on the rotational angle. A rotational angle of the shift drum is to be detected based on the first output value output from the first angle sensor and the second output value output from the second angle sensor.

20 Claims, 20 Drawing Sheets

(56) References Cited

U.S. PATENT DOCUMENTS

| | | | | |
|---|---|---|---|---|
| 4,860,607 A | * | 8/1989 | Numazawa | B60W 10/06 192/3.58 |
| 5,224,393 A | * | 7/1993 | Ashikawa | B60K 20/06 4/619 |
| 7,568,403 B2 | * | 8/2009 | Matsuda | F16H 59/044 74/335 |

* cited by examiner

SHIFT DRUM ANGLE DETECTING DEVICE FOR TRANSMISSION

CROSS-REFERENCE TO RELATED APPLICATIONS

The present application claims priority under 35 U.S.C. § 119 to Japanese Patent Application No. 2014-199941, filed Sep. 30, 2014. The contents of this application are incorporated herein by reference in their entirety.

BACKGROUND OF THE INVENTION

Field of the Invention

The present invention relates to a shift drum angle detecting device for a transmission.

Discussion of the Background

In a transmission of a dual clutch (hereinafter referred to as DCT) type conventionally used in a vehicle, shift forks moved by rotation of a shift drum provided to a change mechanism of the transmission move shifter gears of the transmission, whereby speed change operation is performed (see Japanese Patent Laid-Open No. 2009-156375). The shift drum is provided with a star-shaped cam that is rotated integrally with the shift drum. A cam profile in which a plurality of projections and depressions are alternately arranged at fixed intervals is formed on the outer circumferential surface of the star-shaped cam. A roller of a stopper is pressed against the cam profile. When the shift drum is rotated by a predetermined amount, the roller is pressed against a recessed surface of the cam profile which recessed surface is set at a gear position, so that the shift drum is securely stopped at the set gear position.

In the transmission of the conventional DCT type, when a speed change is made from a first speed to a second speed, the gear position of the shift drum changes from a first speed position (1-N) through a first speed-second speed preparatory speed change position (1-2) to a second speed position (N-2). The transmission has shift stages of six speeds. The shift drum is provided with 12 gear positions (N-N, 1-N, 1-2, N-2, 3-2, 3-N, 3-4, N-4, 5-4, 5-N, 5-6, and N-6) including a neutral position, six speed positions, and preparatory speed change positions. The 12 gear positions are provided at fixed intervals for one rotation of the shift drum. The intervals of the gear positions are therefore intervals of 30 degrees. A gear position sensor as an angle sensor formed by a potentiometer provided to the shift drum needs to detect the intervals of 30 degrees.

SUMMARY OF THE INVENTION

According to one aspect of the present invention, a shift drum angle detecting device for a transmission includes shift forks, a shift drum, a first sensor shaft, a first angle sensor, a speed increasing mechanism, and a second angle sensor. The shift drum angle detecting device is used for the transmission of a constant-mesh type. The transmission includes a main shaft supporting a plurality of driving gears and a counter shaft supporting a plurality of driven gears meshing with a plurality of the driving gears. The shift forks are engaged with shifter gears of the driving gears and the driven gears. The shift drum has an outer circumferential surface in which lead grooves to which one ends of the shift forks are locked are formed. The first sensor shaft is provided to the shift drum and rotated integrally with the shift drum. The first angle sensor detects a rotational angle of the first sensor shaft. The speed increasing mechanism increases an amount of rotation of the first sensor shaft at a predetermined speed increasing ratio. The speed increasing mechanism includes a speed increasing drive member, a speed increasing driven member, and a second sensor shaft. The speed increasing drive member is rotated integrally with the first sensor shaft. The speed increasing driven member is driven by the speed increasing drive member and has a diameter smaller than the speed increasing drive member. The second sensor shaft is rotated integrally with the speed increasing driven member. The second angle sensor detects a rotational angle of the second sensor shaft. The second angle sensor is provided to the second sensor shaft. A rotational angle of the shift drum is detected by using an output value based on the rotational angle detected by the first angle sensor and an output value based on the rotational angle detected by the second angle sensor.

According to another aspect of the present invention, a shift drum angle detecting device for a transmission includes shift forks, a shift drum, a first sensor shaft, a first angle sensor, a speed increasing mechanism, and a second angle sensor. The shift forks are engaged with shifter gears of driving gears and driven gears. The transmission includes a main shaft which supports the driving gears and includes a counter shaft which supports the driven gears meshing with the driving gears. The shift drum has an outer circumferential surface having lead grooves with which one ends of the shift forks are engaged. The first sensor shaft is provided to the shift drum to be rotated with the shift drum. The first angle sensor is to detect a rotational angle of the first sensor shaft to output a first output value based on the rotational angle. The speed increasing mechanism is to increase an amount of rotation of the first sensor shaft at a predetermined speed increasing ratio. The speed increasing mechanism includes a speed increasing drive member, a speed increasing driven member, and a second sensor shaft. The speed increasing drive member is to be rotated with the first sensor shaft. The speed increasing driven member is to be rotated by the speed increasing drive member. The speed increasing driven member has a diameter smaller than a diameter of the speed increasing drive member. The second sensor shaft is to be rotated with the speed increasing driven member. The second angle sensor is provided to the second sensor shaft to detect a rotational angle of the second sensor shaft and to output a second output value based on the rotational angle. A rotational angle of the shift drum is to be detected based on the first output value output from the first angle sensor and the second output value output from the second angle sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
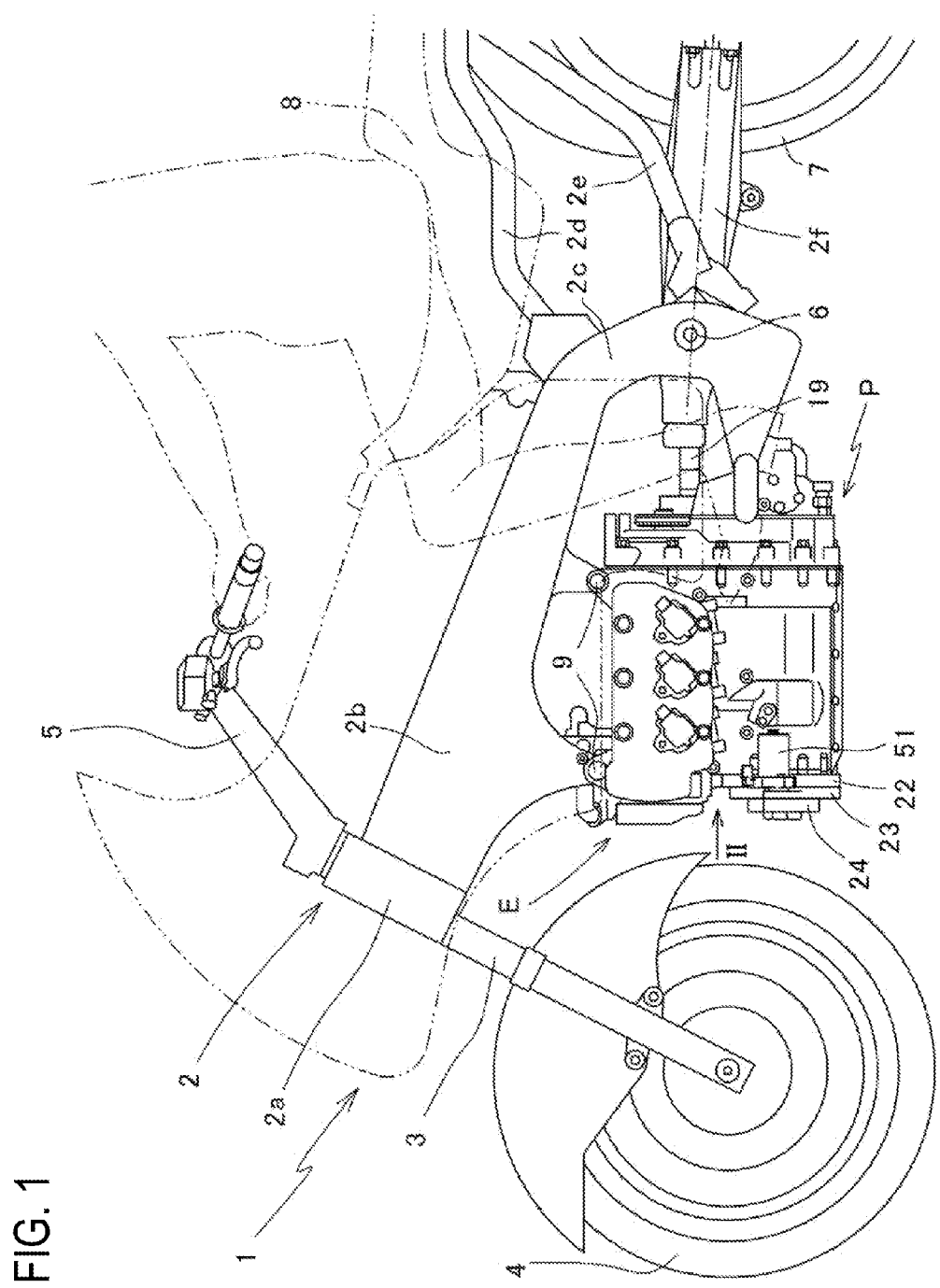
FIG. 1 is a left side view of a motorcycle mounted with a power unit having a shift drum angle detecting device for a transmission according to an embodiment of the present invention.

The embodiments will now be described with reference to the accompanying drawings, wherein like reference numerals designate corresponding or identical elements throughout the various drawings.

An embodiment of a shift drum angle detecting device for a transmission according to the present disclosure will hereinafter be described with reference to the drawings.

FIG. 1 is a left side view of a motorcycle 1 mounted with a power unit P including a shift drum angle detecting device 100 for a transmission 31 according to an embodiment of the present invention.

The power unit P includes: a horizontally opposed six-cylinder water-cooled four-stroke-cycle internal combustion engine E mounted in the motorcycle 1 in a so-called longitudinally installed manner with a crankshaft 16 along the forward-rearward direction of a vehicle; and the transmission 31 that is coupled to the internal combustion engine E and makes a speed change to transmit a driving force of the internal combustion engine E in a predetermined shift stage.

In the figures, an arrow FR indicates a front in accordance with the direction of the vehicle, an arrow RE indicates a rear, an arrow LT indicates a left direction, an arrow RT indicates a right direction, an arrow UP indicates an upward direction, and an arrow DW indicates a downward direction.

As shown in FIG. 1, a vehicle body frame 2 of the motorcycle 1 includes: a pair of left and right main frames 2b that extend rearward and slightly obliquely downward from a head pipe 2a of a vehicle body front portion and then extend downward to form end portions via bent portions 2c; seat rails 2d that extend rearward and slightly obliquely upward from the bent portions 2c of the main frames 2b; and back stays 2e that connect rear portions of the seat rails 2d to lower portions of the bent portions 2c of the main frames 2b.

The head pipe 2a supports a front fork 3 extending downward from the head pipe 2a so as to be rockable to the left and right. Lower ends of the front fork 3 rotatably support a front wheel 4. Steering handlebars 5 are integrally coupled to an upper end of the front fork 3.

In addition, lower portions of the bent portions 2c of the main frames 2b vertically swingably support a front end portion of a swing arm 2f extending rearward via a pivot shaft 6. A rear end portion of the swing arm 2f rotatably supports a rear wheel 7.

A cushion unit not shown in the figure is coupled between the bent portions 2c of the main frames 2b and the swing arm 2f. A riding seat 8 is attached to upper portions of the seat rails 2d.

The internal combustion engine E for driving the rear wheel 7 is disposed below the main frames 2b. The internal combustion engine E is mounted in the motorcycle 1 by being suspended by a plurality of attachment brackets 9.

Figure 2:
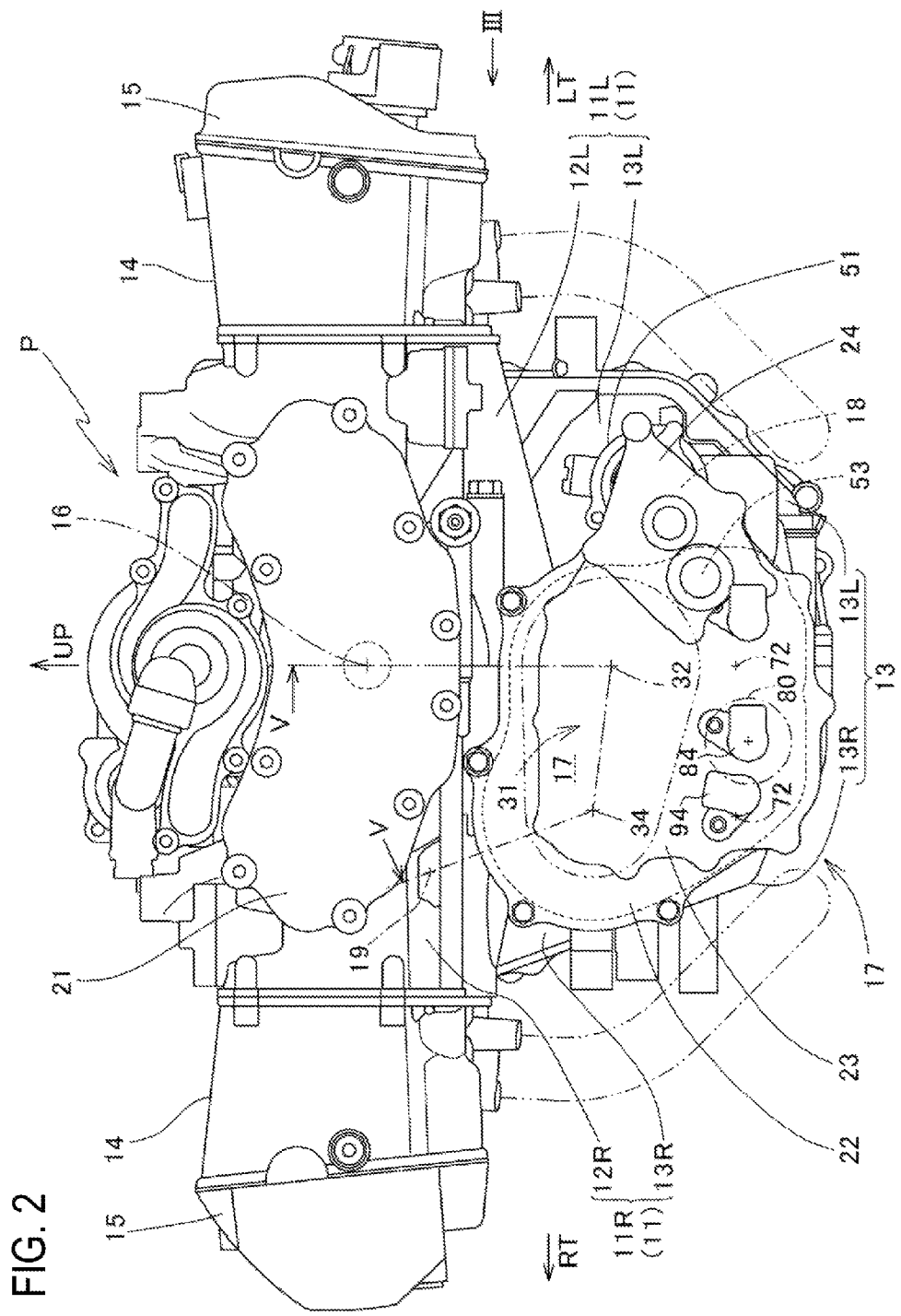
FIG. 2 is a front view of the power unit in FIG. 1, the front view being taken in the direction of an arrow II.

FIG. 2 is a front view of the power unit P in FIG. 1, the front view being taken in the direction of an arrow II.

As shown in FIG. 2, the internal combustion engine E includes: an engine block 11 constituted of a left engine block half 11L disposed on the left side in a state of facing forward in the traveling direction of the motorcycle 1 and a right engine block half 11R disposed on the right side in a state of facing forward in the traveling direction; cylinder heads 14 each coupled to a left end and a right end of the left and right engine block halves 11L and 11R; and head covers 15 mounted on the respective cylinder heads 14.

The left engine block half 11L includes a left cylinder block 12L and a left crankcase half 13L formed integrally with the left cylinder block 12L. The right engine block half 11R includes a right cylinder block 12R and a right crankcase half 13R formed integrally with the right cylinder block 12R. The left crankcase half 13L and the right crankcase half 13R form a crankcase 13.

Figure 3:
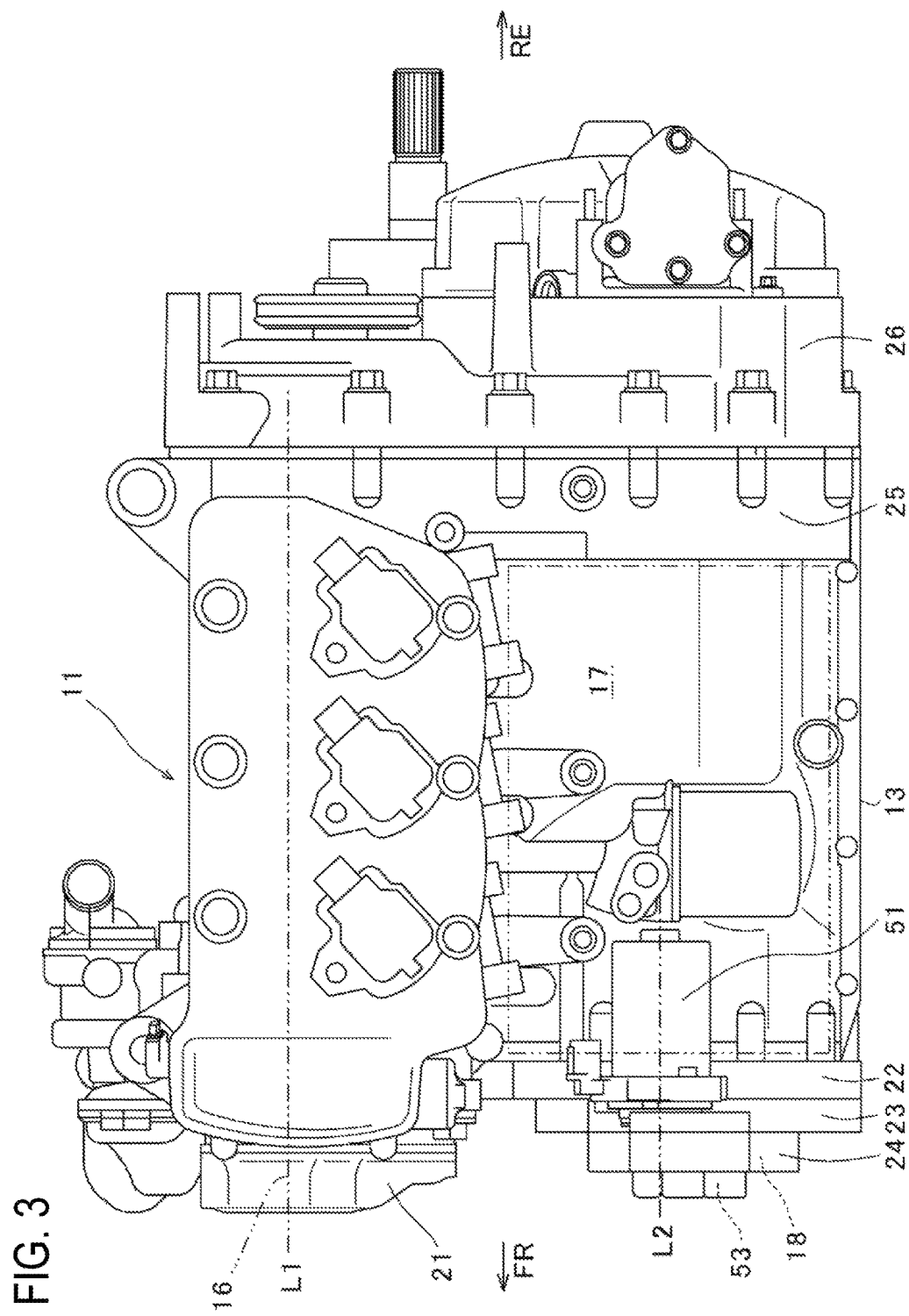
FIG. 3 is a left side view of the power unit in FIG. 2, the left side view being taken in the direction of an arrow III.

FIG. 3 is a left side view of the power unit P in FIG. 2, the left side view being taken in the direction of an arrow III.

Referring also to FIG. 3, the crankshaft 16 is rotatably supported between the left cylinder block 12L and the right cylinder block 12R located in the upper portion of the engine block 11 with the rotation axis L1 of the crankshaft 16 oriented in the forward-rearward direction of the motorcycle 1.

A piston (not shown) within the engine block 11 is coupled to the crankshaft 16 via a connecting rod (not shown). The crankshaft 16 is rotation-driven in such a manner as to be interlocked with the sliding of the piston due to combustion within a combustion chamber (not shown).

As shown in FIG. 2 and FIG. 3, a front cover 21 covering the front surface of the upper portion of the engine block 11 is attached to the front surface of the upper portion of the engine block 11 with the crankshaft 16 at a center. In addition, a transmission chamber 17 in which the transmission 31 to be described later is housed is defined by the left and right crankcase halves 13L and 13R in the lower portion of the engine block 11. Incidentally, the transmission chamber 17 is indicated by a chain double-dashed line.

As shown in FIG. 3, a rear cover 25 is attached to the rear of the engine block 11. In addition, a clutch cover 26 is attached to the rear of a lower central portion of the rear cover 25.

As shown in FIG. 2 and FIG. 3, a transmission holder 22 is attached the front surface of the lower portion of the crankcase 13 in such a manner as to cover the front of the transmission chamber 17. In addition, a change system holder 23 for holding a change mechanism 60 that operates the shift stage of the transmission 31 is attached to the front surface of the transmission holder 22 from the center to the lower portion of the transmission holder 22.

A reduction gear cover 24 is attached to the front surface of the left end portion of the change system holder 23. A reduction gear mechanism 53 to be described later is disposed within a reduction gear chamber 18 enclosed by the change system holder 23 and the reduction gear cover 24. In addition, a shift motor 51, which is a power source of a shift driving device 30, is provided to the rear surface of the left end portion of the change system holder 23.

Figure 4:
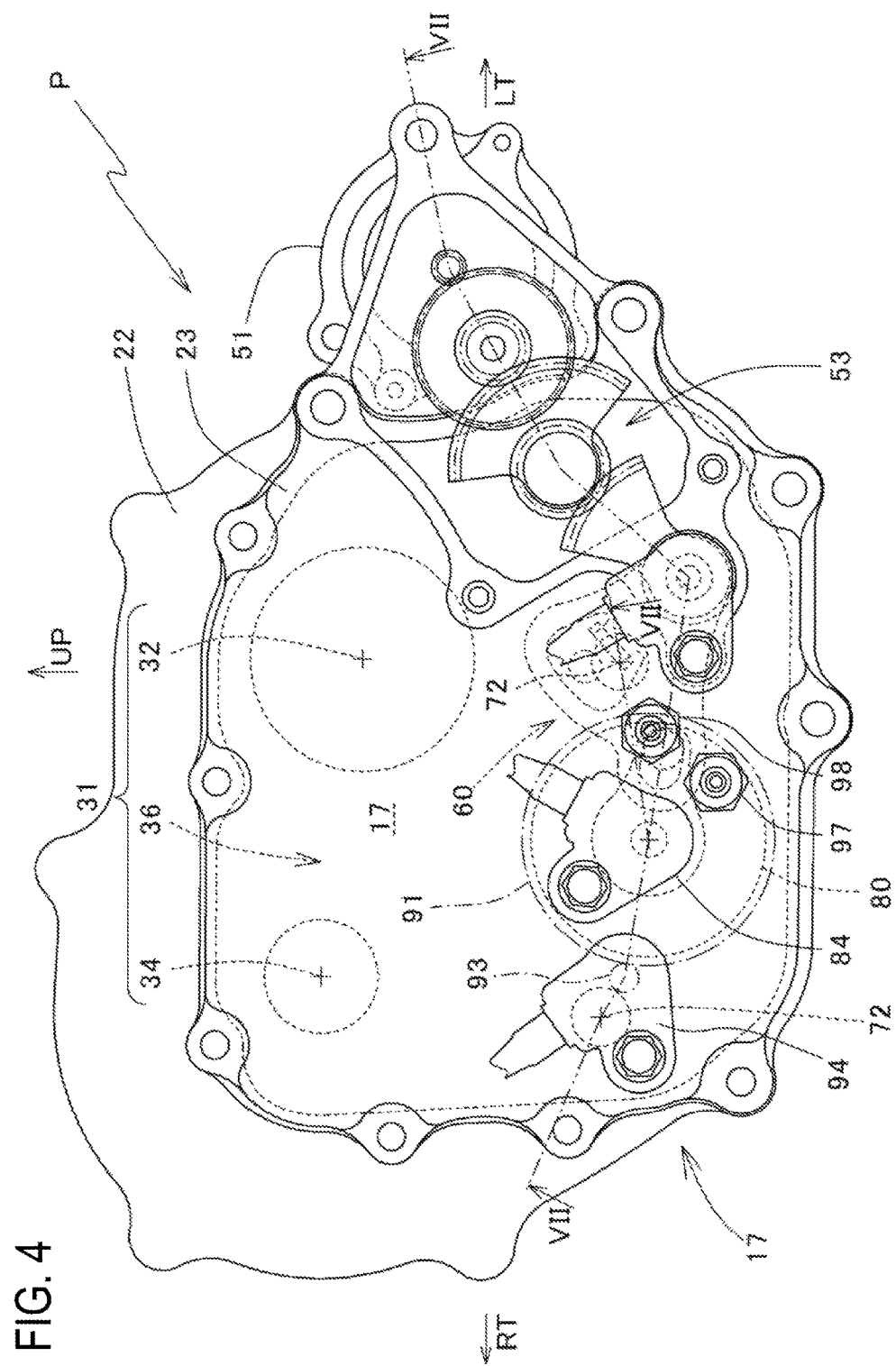
FIG. 4 is an enlarged front view partially showing, in enlarged dimension, a crankcase in a lower portion of the power unit in FIG. 2 in a state in which a reduction gear cover is removed.

FIG. 4 is an enlarged front view partially showing, in enlarged dimension, the crankcase 13 in the lower portion of the power unit P in FIG. 2 in a state in which the reduction gear cover 24 is removed.

As shown in FIG. 4, a main shaft 32, a counter shaft 34, a gear speed change mechanism 36, a shift drum 80, and shift fork shafts 72 are sub-assembled and formed integrally as a cassette unit on the rear surface of the transmission holder 22. The cassette unit is inserted into the transmission chamber 17 formed by the left and right crankcase halves 13L and 13R. The transmission holder 22 is thus attached to the front surface of the crankcase 13 so as to cover the front of the transmission chamber 17. The use of such a cassette unit facilitates the assembling of the main shaft 32, the counter shaft 34, the gear speed change mechanism 36, the shift drum 80, and the shift fork shafts 72 to the crankcase 13. Incidentally, the cassette unit may be attached to the crankcase 13 in a state in which the reduction gear cover 24 and the shift motor 51 are also integrated into the unit (subassembly).

The main shaft 32, the counter shaft 34, the shift drum 80, and the shift fork shafts 72 inserted in the transmission chamber 17 are arranged so as to be parallel with the rotation axis L1 of the crankshaft 16. In addition, as shown in FIG. 2, the main shaft 32 is disposed below the crankshaft 16, and the counter shaft 34 is disposed on the right of the main shaft 32. The shift drum 80 is disposed in the center of the lower portion of the transmission chamber 17. The two shift fork shafts 72 are arranged on the left and right of the shift drum 80 and below the main shaft 32 and the counter shaft 34.

Figure 5:
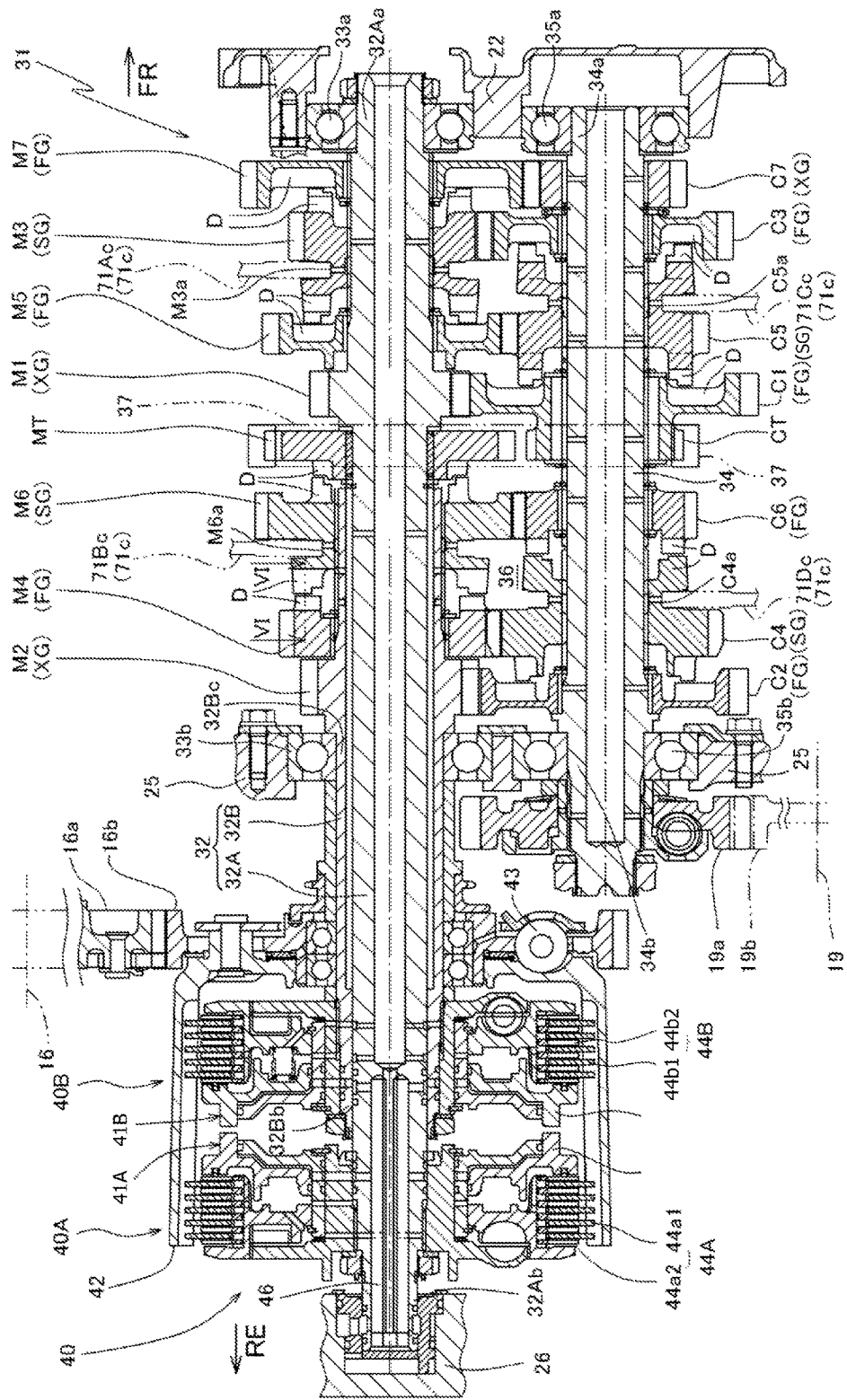
FIG. 5 is a sectional view of a transmission, the sectional view being taken along a line V-V of FIG. 2.

FIG. 5 is a sectional view of the transmission 31, the sectional view being taken along a line V-V of FIG. 2.

As shown in FIG. 5, the transmission 31 includes the main shaft 32 as an input shaft, the counter shaft 34 as an output shaft, the gear speed change mechanism 36, and a hydraulic clutch 40 that connects and disconnects the transmission of a rotational driving force from the crankshaft 16 by hydraulic pressure.

The main shaft 32 of the transmission 31 is constituted of a first main shaft 32A and a tubular second main shaft 32B. The relative position in the axial direction of the first main shaft 32A relative to the second main shaft 32B is fixed, and the first main shaft 32A passes through the second main shaft 32B. A plurality of needle bearings (not shown) are interposed between the first main shaft 32A and the second main shaft 32B. A front end portion 32Aa of the first main shaft 32A is rotatably supported by the transmission holder 22 via a ball bearing 33a. A rear end portion 32Ab of the first main shaft 32A is rotatably supported by the clutch cover 26. The second main shaft 32B has an intermediate portion 32Bc passing through the rear cover 25 and rotatably supported by the rear cover 25 via a ball bearing 33b.

The counter shaft 34 has a front end portion 34a rotatably supported by the transmission holder 22 via a ball bearing 35a, and has a rear end portion 34b disposed so as to pass through a ball bearing 35b provided to the rear cover 25 and rotatably supported by the rear cover 25 via the ball bearing 35b. A secondary driving gear 19a meshing with a secondary driven gear 19b is spline-fitted in the vicinity of the rear end portion 34b of the counter shaft 34.

Seven driving gears M corresponding to a first speed to a seventh speed and a driven sprocket MT for reverse are supported by the main shaft 32 between the transmission holder 22 and the rear cover 25. Seven driven gears C corresponding to the driving gears M and meshing with the driving gears M at all times and a driving sprocket CT for reverse are supported by the counter shaft 34 between the transmission holder 22 and the rear cover 25. The driving gears M, the driven gears C, the driving sprocket CT, and the driven sprocket MT form the gear speed change mechanism 36.

Out of the driving gears M, the driving gears M1, M3, M5, and M7 in odd-numbered stages and the driven sprocket MT are supported on the side of the front end portion 32Aa of the first main shaft 32A passing through the second main shaft 32B in order of the seventh speed driving gear M7, the third speed driving gear M3, the fifth speed driving gear M5, the first speed driving gear M1, and the driven sprocket MT from the front side.

The first speed driving gear M1 is a fixed gear XG formed integrally with the first main shaft 32A and rotated integrally with the first main shaft 32A. The third speed driving gear M3 is a shifter gear SG spline-fitted to the first main shaft 32A to rotate integrally with the first main shaft 32A and movable in the axial direction of the first main shaft 32A. The fifth speed driving gear M5 and the seventh speed driving gear M7 are free gears FG rotatable relative to the first main shaft 32A and fixed immovably in the axial direction. The driven sprocket MT is rotatable relative to the first main shaft 32A and fixed immovably in the axial direction.

Out of the driving gears M, the driving gears M2, M4, and M6 in even-numbered stages are supported by a first half portion of the second main shaft 32B, which first half portion is located forward of the rear cover 25, in order of the sixth speed driving gear M6, the fourth speed driving gear M4, and the second speed driving gear M2 from the front side.

The second speed driving gear M2 is a fixed gear XG formed integrally with the second main shaft 32B and rotated integrally with the second main shaft 32B. The fourth speed driving gear M4 is a free gear FG rotatable relative to the second main shaft 32B and fixed immovably in the axial direction. The sixth speed driving gear M6 is a shifter gear SG spline-fitted to the second main shaft 32B to rotate integrally with the second main shaft 32B and movable in the axial direction of the second main shaft 32B.

The driven gears C and the driving sprocket CT are supported by the counter shaft 34 in order of the seventh speed driven gear C7, the third speed driven gear C3, the fifth speed driven gear C5, the first speed driven gear C1, the driving sprocket CT, the sixth speed driven gear C6, the fourth speed driven gear C4, and the second speed driven gear C2 from the front side.

The seventh speed driven gear C7 is a fixed gear XG non-rotatable relative to the counter shaft 34 and fixed immovably in the axial direction. The first speed driven gear C1, the second speed driven gear C2, the third speed driven gear C3, and the sixth speed driven gear C6 are free gears FG rotatable relative to the counter shaft 34 and fixed immovably in the axial direction. The fourth speed driven gear C4 and the fifth speed driven gear C5 are shifter gears SG spline-fitted to the counter shaft 34 to rotate integrally with the counter shaft 34 and movable in the axial direction of the counter shaft 34. The driving sprocket CT is formed integrally with the first speed driven gear C1, and is disposed so as to face the driven sprocket MT. A chain 37 for reverse is suspended between the driving sprocket CT and the driven sprocket MT.

Engaging grooves M3a, M6a, C4a, and C5a with which pawl portions 71c of shift forks 71 to be described later are engaged are formed in the respective shifter gears M3, M6, C4, and C5. The shifter gears M3, M6, C4, and C5 are moved in the axial direction as the shift forks 71 are operated.

The shifter gears M3, M6, C4, and C5, the free gears M4, M5, M7, C1, C2, C3, and C6, and the driven sprocket MT have dog teeth D formed so as to be engageable with and disengageable from each other. When the dog teeth D of the respective shifter gears M3, M6, C4, and C5 are engaged with the dog teeth D of the free gears M4, M5, M7, C1, C2, C3, and C6 or the driven sprocket MT, the rotational driving force of the main shaft 32 is transmitted to the counter shaft 34.

Figure 6:
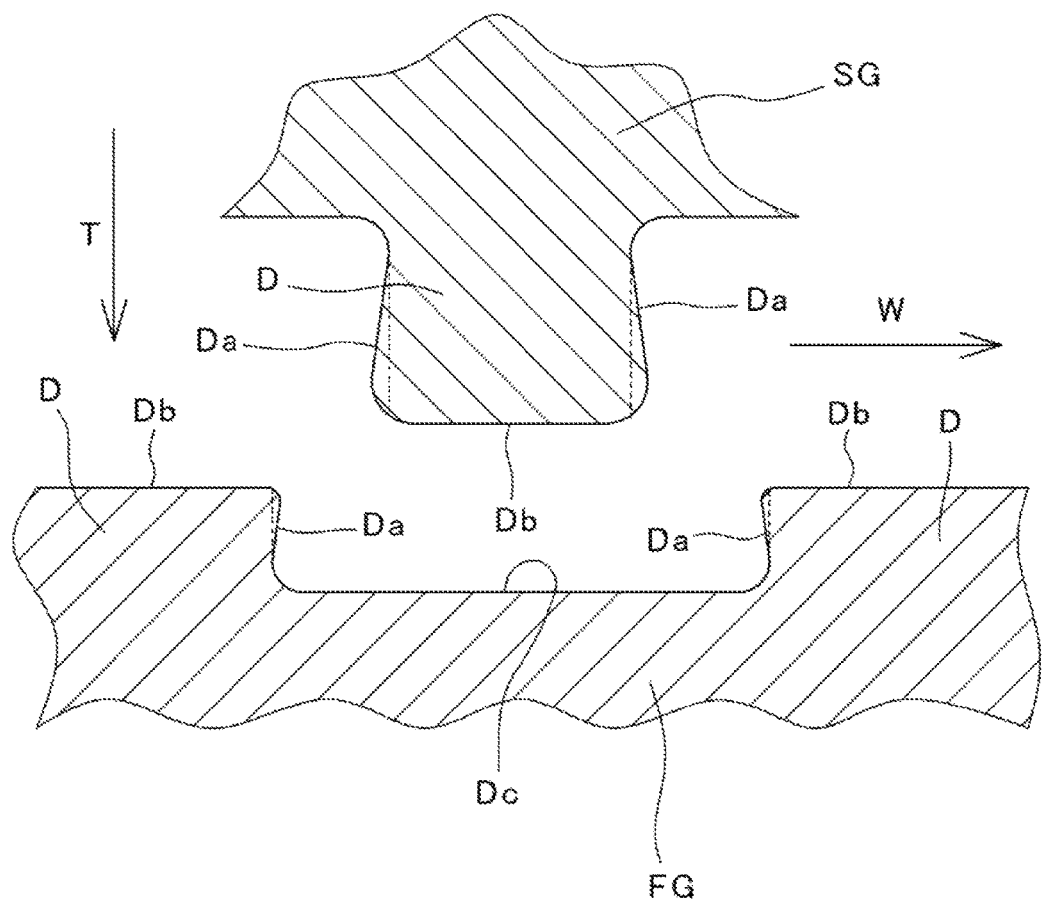
FIG. 6 is a sectional view schematically showing the section of dog teeth which section is taken along a line VI-VI of FIG. 5.

FIG. 6 is a sectional view schematically showing the section of dog teeth D which section is taken along a line VI-VI of FIG. 5. As shown in FIG. 6, in the present embodiment, a dog tooth D is formed as a so-called reverse tapered dog tooth D such that width in a circumferential direction W of an engaging surface Da of the dog tooth D is gradually increased toward the outside in the axial direction T. When the shifter gear SG moves in the direction of an adjacent free gear FG, and the dog teeth D and D of the gears mesh with each other, the reverse taper produces a thrust load (load in the axial direction), and thus the shifter gear SG is drawn to the free gear FG.

Incidentally, in the present embodiment, an end portion Db of the dog teeth D of the shifter gear SG is formed so as to abut against a bottom portion Dc between the dog teeth D and D of the free gear FG at the time of the engagement of the shifter gear SG with the free gear FG, thus improving the accuracy of positioning of the shifter gear SG.

As shown in FIG. 5, the hydraulic clutch 40 is provided to a second half portion of the main shaft 32 which second half portion is disposed so as to project rearward of the rear cover 25.

The hydraulic clutch 40 is formed as a so-called dual clutch (twin clutch) system including: a first hydraulic clutch 40A coupled to the first main shaft 32A; a second hydraulic clutch 40B coupled to the second main shaft 32B; and a clutch outer 42. A first clutch inner 41A of the first hydraulic clutch 40A is spline-fitted in the vicinity of the rear end portion 32Ab of the first main shaft 32A disposed so as to project rearward of a rear end portion 32Bb of the second main shaft 32B, while the movement of the first clutch inner 41A in the axial direction is limited. A second clutch inner 41B of the second hydraulic clutch 40B is spline-fitted in the vicinity of the rear end portion 32Bb of the second main shaft 32B, while the movement of the second clutch inner 41B in the axial direction is limited.

The clutch outer 42 is supported, via a cushioning member 43, by a primary driven gear 16b rotatably supported by the second main shaft 32B between the second hydraulic clutch 40B and the rear cover 25. The primary driven gear 16b meshes with a primary driving gear 16a fitted to the crankshaft 16. Thus, the rotational driving force supplied from the crankshaft 16 is reduced in speed at a predetermined reduction ratio, and then transmitted to the hydraulic clutch 40.

A first friction plate group 44A is provided between the clutch outer 42 and the first clutch inner 41A so as to be able to be pressurized by a first pressurizing plate (not shown), the first friction plate group 44A being formed by alternately arranging driving friction plates 44a1 rotating together with the clutch outer 42 and driven friction plates 44a2 rotating together with the first clutch inner 41A. In addition, a second friction plate group 44B is provided between the clutch outer 42 and the second clutch inner 41B so as to be able to be pressurized by a second pressurizing plate (not shown), the second friction plate group 44B being formed by alternately arranging driving friction plates 44b1 rotating together with the clutch outer 42 and driven friction plates 44b2 rotating together with the second clutch inner 41B.

A hydraulic pressure circuit 46 that can selectively drive the first pressurizing plate (not shown) and the second pressurizing plate (not shown) is provided to the second main shaft 32B and the clutch cover 26. The hydraulic pressure circuit 46 connects and disconnects the rotational driving force from the crankshaft 16 by hydraulic pressure, whereby switching between the first hydraulic clutch 40A and the second hydraulic clutch 40B is performed and the power is transmitted from the crankshaft 16 to the main shaft 32. Then the power transmitted from the crankshaft 16 to the main shaft 32 is transmitted to the secondary driving gear 19a in a shift stage selectively established by the gear speed change mechanism 36, and is output to the rear wheel 7 via the secondary driven gear 19b and a drive shaft 19.

Figure 7:
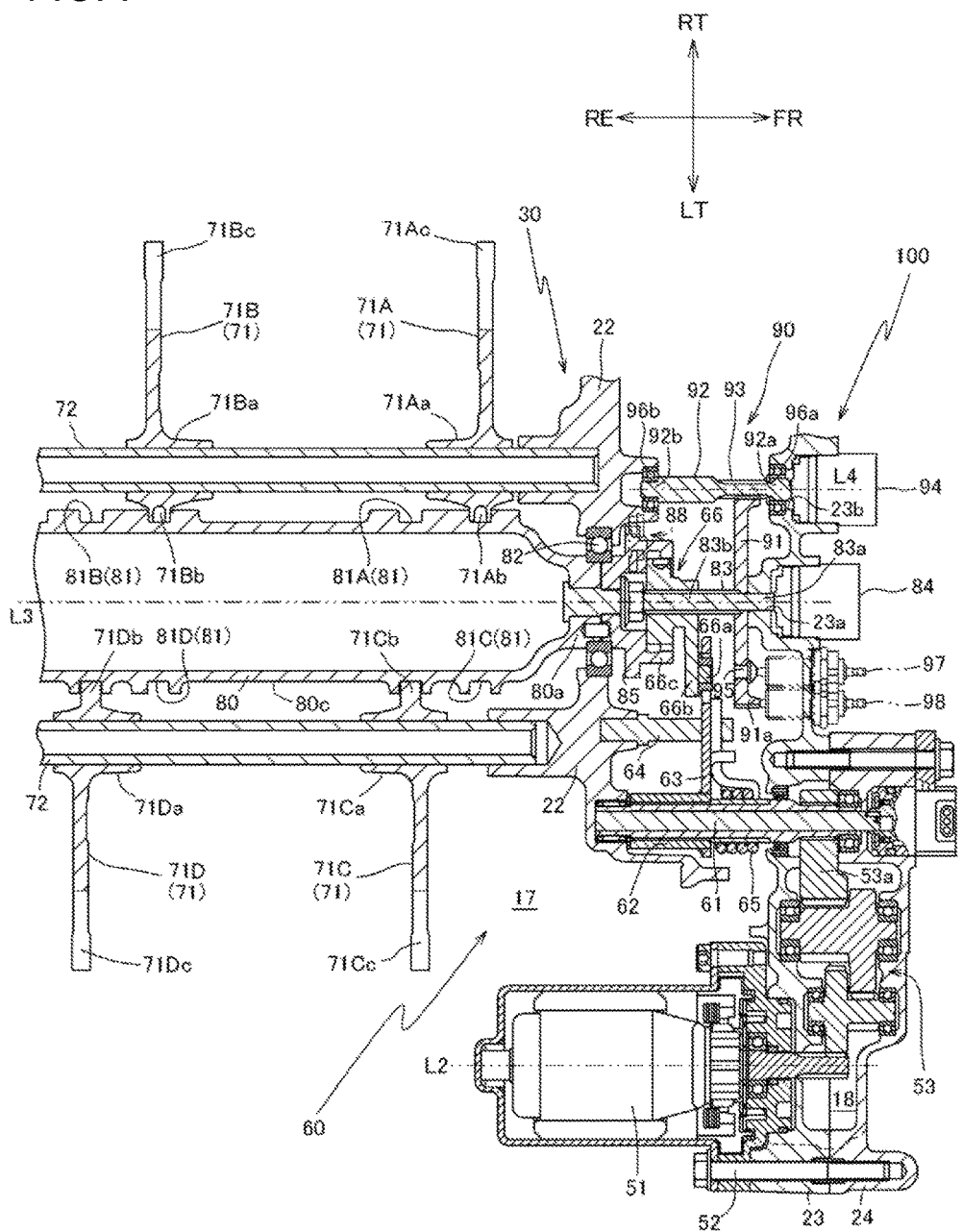
FIG. 7 is a sectional view of a shift driving device, the sectional view being taken along a line VII-VII of FIG. 2.

FIG. 7 is a sectional view of the shift driving device 30, the sectional view being taken along a line VII-VII of FIG. 4.

As shown in FIG. 7, the shift driving device 30 includes: the shift drum angle detecting device 100; the change mechanism 60 selectively establishing the shift stage of the transmission 31 while interlocked with the shift drum angle detecting device 100; the shift motor 51 supplying rotational power to the change mechanism 60; the reduction gear mechanism 53 reducing the speed of the rotational power input from the shift motor 51 and outputting the rotational power to the change mechanism 60. The power necessary for speed change is transmitted to the change mechanism 60 from the shift motor 51 via the reduction gear mechanism 53. In the change mechanism 60, the rotation of a shift spindle 61 and a master arm 63 causes a pawl ratchet mechanism 66 to intermittently rotate the shift drum 80 controlled by the shift drum angle detecting device 100, and the shift forks 71 move the shifter gears SG of the transmission 31, whereby the shift stage is changed.

As shown in FIG. 2, FIG. 3, and FIG. 7, the shift motor 51 has a rotation axis L2 oriented in the forward-rearward direction so as to be parallel with the rotation axis L1 of the crankshaft 16. Substantially the entire surface of the shift motor 51 is covered by the reduction gear cover 24 as viewed from the front. Part of the shift motor 51 is disposed on the left side of the transmission chamber 17 as viewed from the side. The shift motor 51 is fixed to the change system holder 23 by a bolt 52.

As shown in FIG. 7, the change system holder 23 and the reduction gear cover 24 define the reduction gear chamber 18 in front of the shift motor 51. The shift motor 51 is connected to the reduction gear mechanism 53 disposed within the reduction gear chamber 18.

The change mechanism 60 is positioned in front of the transmission chamber 17. The change mechanism 60 includes the shift spindle 61, the master arm 63, a stopper pin 64 regulating an amount of rotation of the master arm 63, and the pawl ratchet mechanism 66. The change mechanism 60 rotates the shift spindle 61 by the rotational power transmitted from the shift motor 51 via the reduction gear mechanism 53. The pawl ratchet mechanism 66 intermittently rotates the shift drum 80 in such a manner as to be interlocked with the master arm 63, which is rotated in such a manner as to be interlocked with the rotation of the shift spindle 61.

The shift spindle 61 is positioned to the left of and in front of the shift drum 80. The shift spindle 61 is disposed with a rotation axis thereof oriented in the forward-rearward direction such that the axial direction of the shift spindle 61 is parallel with that of the shift drum 80. A driven gear 53a of the reduction gear mechanism 53 is serration-fitted to the front end side of the shift spindle 61. The master arm 63 is coupled to the rear end side of the shift spindle 61 via an extension collar member 62.

Figure 8:
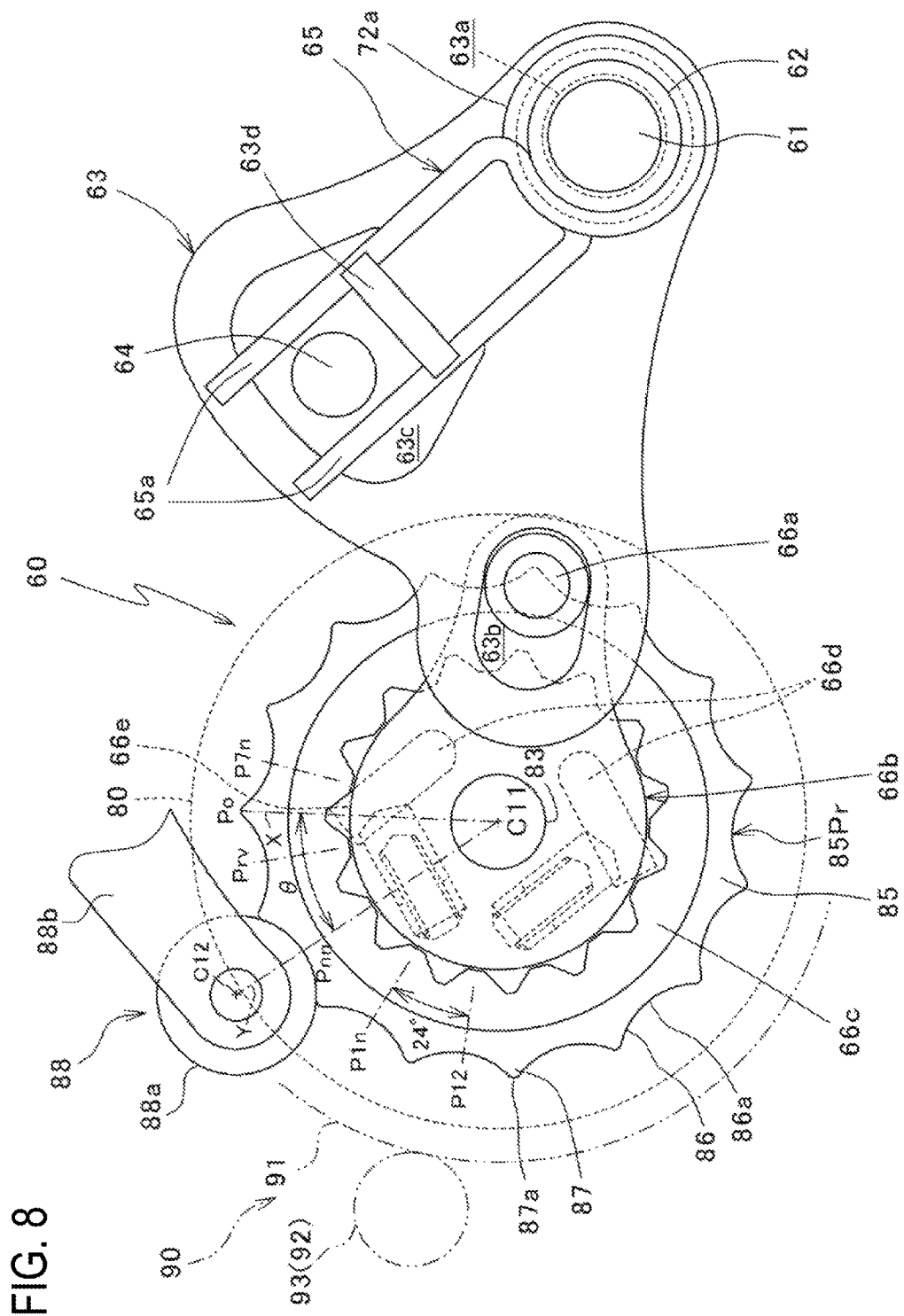
FIG. 8 is a fragmentary enlarged view showing a change mechanism in a partially simplified manner.
Figure 9:
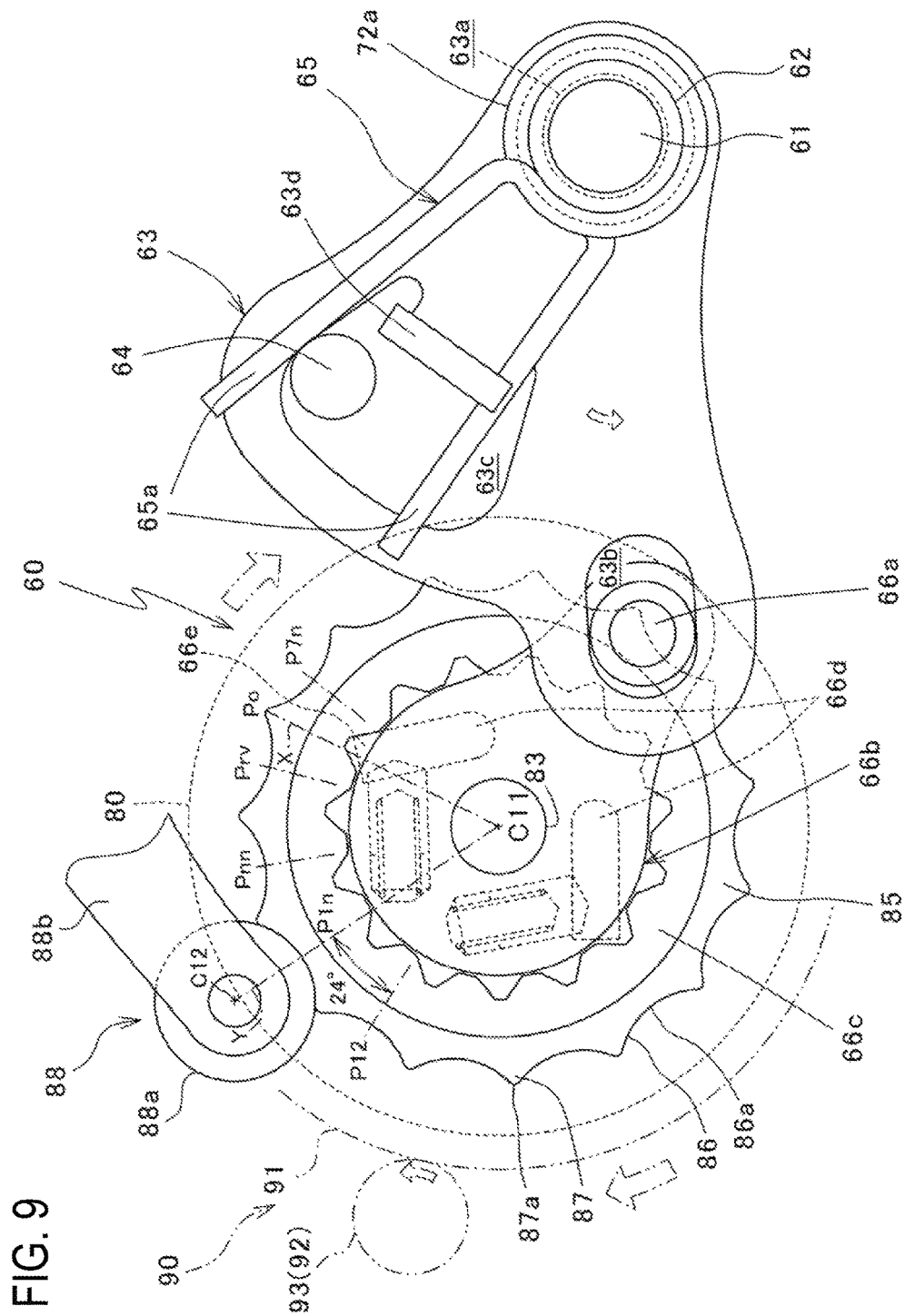
FIG. 9 is a fragmentary enlarged view showing a state in which a shift drum is rotated in a shift-up direction from the state of FIG. 8.

FIG. 8 is a fragmentary enlarged view showing the change mechanism 60 in a partially simplified manner. FIG. 9 is a fragmentary enlarged view showing a state in which the shift drum 80 is rotated in a shift-up direction from the state of FIG. 8.

As shown in FIG. 8, the master arm 63 is formed in a substantially triangular plate shape. Formed in the master arm 63 are a circular hole 63a, a driving hole 63b in the shape of a rectangle with rounded corners, and a substantially trapezoidal regulating hole 63c. The shift spindle 61 is inserted into the circular hole 63a. A driven projection 66a of the pawl ratchet mechanism 66 is slidably fitted into the driving hole 63b. The stopper pin 64 is inserted into the regulating hole 63c. A locking portion 63d is formed between the regulating hole 63c and the circular hole 63a. End portions 65a of a coil spring 65 provided to the shift spindle 61 are locked to the locking portion 63d.

As shown in FIG. 7 and FIG. 8, the pawl ratchet mechanism 66 includes: a shift input member 66b on which the driven projection 66a slidably fitted in the driving hole 63b of the master arm 63 is formed; a rotary member 66c rotating integrally with the shift drum 80; and a pair of poles 66d included in the rotary member 66c and biased so as to engage with the inner circumference of the rotary member 66c.

As shown in FIG. 9, when a rotation of the master arm 63 causes the shift input member 66b to be guided by the driven projection 66a sliding in the driving hole 63b, and thus rotated in one direction, one end 66e of the poles 66d rises and is locked to the rotary member 66c, and the rotary member 66c is rotated in such a manner as to be interlocked with the rotation of the shift input member 66b, so that the shift drum 80 is intermittently rotated. The shift stage of the transmission 31 is thus determined.

The shift drum angle detecting device 100 according to the embodiment of the present invention will next be described. The shift drum angle detecting device 100 includes the shift forks 71, the shift drum 80, a first sensor shaft 83, a first angle sensor 84, a speed increasing mechanism 90, and a second angle sensor 94. The shift drum angle detecting device 100 detects the rotational angle of the shift drum 80 using the first angle sensor 84 and the second angle sensor 94 of the speed increasing mechanism 90 when a shift fork 71 moved in the axial direction by the rotation of the shift drum 80 operates a shifter gear SG to establish a shift stage of the transmission 31. The details will be described later.

Incidentally, the first and second angle sensors 84 and 94 detect an amount of rotation of an object to be measured from a predetermined reference position as a voltage.

As shown in FIG. 7, the shift forks 71 include a first shift fork 71A, a second shift fork 71B, a third shift fork 71C, and a fourth shift fork 71D. The shift fork shafts 72 support base portions 71Aa, 71Ba, 71Ca, and 71Da of the respective shift forks slidably in the axial direction. Cylindrical pin portions 71Ab, 71Bb, 71Cb, and 71Db are formed on the base portions 71Aa, 71Ba, 71Ca, and 71Da of the respective shift forks 71A, 71B, 71C, and 71D so as to project to lead grooves 81 of the shift drum 80, which lead grooves will be described later.

Referring also to FIG. 5, pawl portions 71Ac, 71Bc, 71Cc, and 71Dc of the respective shift forks 71 which pawl portions are located on the side of the shifter gears SG are locked to locking grooves M3a, M6a, C4a, and C5a provided to the respective shifter gears M3, M6, C4, and C5 such that the shifter gears M3, M6, C4, and C5 are rotatable. As the shift forks 71 move in the axial direction, the respective shifter gears M3, M6, C4, and 05 are moved in the axial direction.

As shown in FIG. 7, the shift drum 80 is formed in a cylindrical shape whose inside is hollow. The shift drum 80 has a front end portion 80a rotatably supported by the transmission holder 22 via a ball bearing 82, and has a rear end portion (not shown) rotatably supported by the rear cover (not shown) via a needle bearing (not shown).

Figure 10:
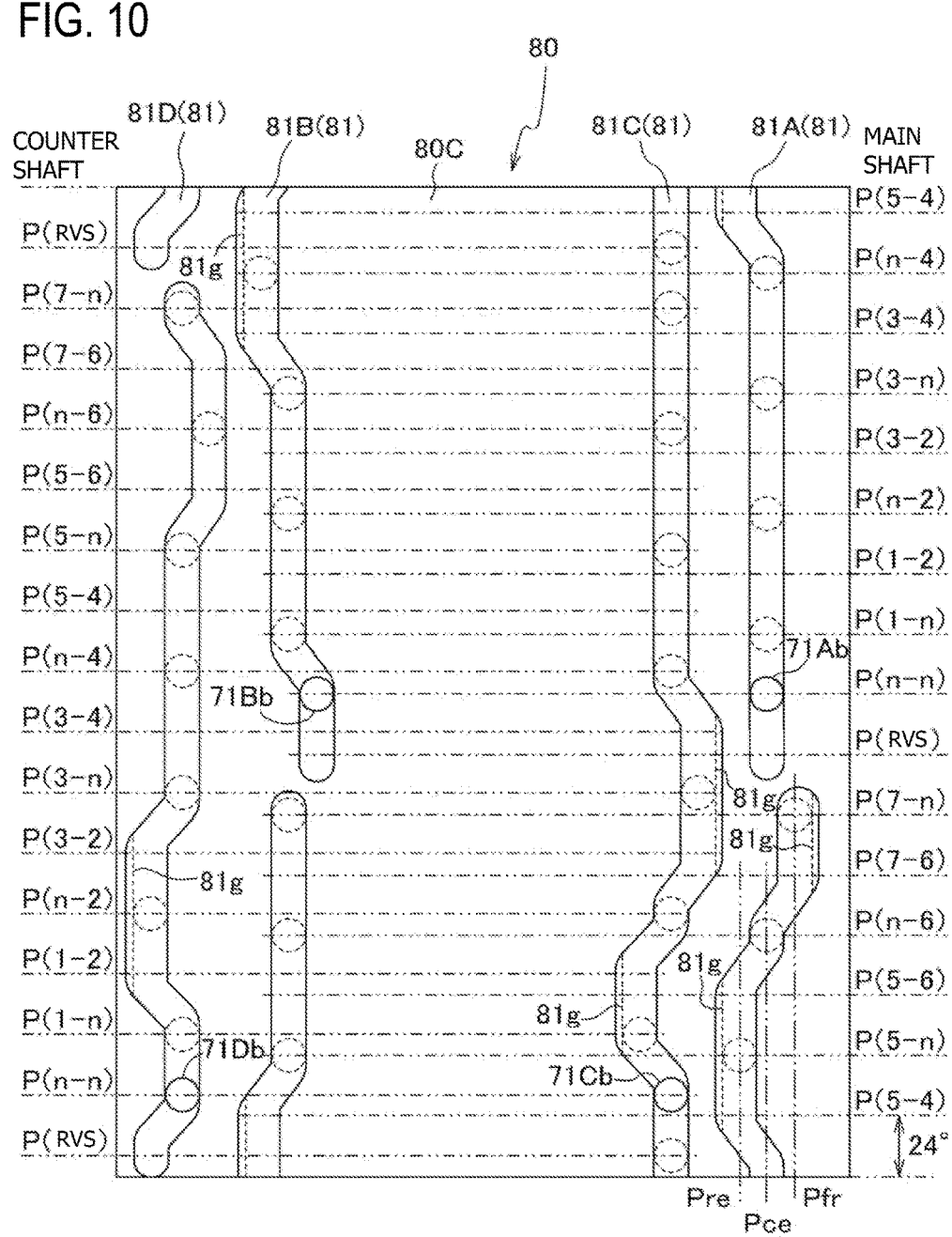
FIG. 10 is a developed view of lead grooves of the shift drum.

FIG. 10 is a developed view of the lead grooves 81 of the shift drum 80.

In FIG. 10, solid line circles within the lead grooves 81 represent the pin portions 71Ab, 71Bb, 71Cb, and 71Db of the respective shift forks 71A, 71B, 71C, and 71D (not shown) when the shift drum 80 is in a neutral position P (n-n). Broken line circles represent the pin portions 71Ab, 71Bb, 71Cb, and 71Db of the respective shift forks 71A, 71B, 71C, and 71D at respective gear positions P (RVS) to P (7-n) indicated by chain double-dashed lines.

Fifteen gear positions GP are sequentially set in the shift drum 80 at intervals of 24 degrees, the fifteen gear positions GP being a reverse position P (RVS), a neutral position P (n-n), a first speed position P (1-n), a first speed-second speed preparatory position P (1-2), a second speed position P (n-2), a second speed-third speed preparatory position P (3-2), a third speed position P (3-n), a third speed-fourth speed preparatory position P (3-4), a fourth speed position P (n-4), a fourth speed-fifth speed preparatory position P (5-4), a fifth speed position P (5-n), a fifth speed-sixth speed preparatory position P (5-6), a sixth speed position P (n-6), a sixth speed-seventh speed preparatory position P (7-6), and a seventh speed position P (7-n).

As shown in FIG. 7 and FIG. 10, four lead grooves 81 are provided in a radially outer circumferential surface 80c of the shift drum 80. The lead grooves 81 are formed as patterns that are along the circumferential direction of the shift drum 80 while partly offset in the axial direction of the shift drum 80.

The lead grooves 81 include a first lead groove 81A, a second lead groove 81B, a third lead groove 81C, and a fourth lead groove 81D. The pin portion 71Ab of the first shift fork 71A is slidably engaged with the first lead groove 81A. The pin portion 71Bb of the second shift fork 71B is slidably engaged with the second lead groove 81B. The pin portion 71Cb of the third shift fork 71C is slidably engaged with the third lead groove 81C. The pin portion 71Db of the fourth shift fork 71D is slidably engaged with the fourth lead groove 81D.

The rotation of the shift drum 80 causes the pin portions 71Ab, 71Bb, 71Cb, and 71Db to be guided according to the patterns of the respective lead grooves 81A, 81B, 81C, and 81D of the shift drum 80. The shift forks 71A, 71B, 71C, and 71D thereby move on the shift fork shafts 72 in the axial direction. Incidentally, the shift forks 71A, 71B, 71C, and 71D and the shifter gears M3, M6, C4, and C5, the positions of which are determined by the respective lead grooves, have three movement positions, that is, a "rear position," a "central position," and a "front position."

As shown in FIG. 10, positions in the lead grooves 81A, 81B, 81C, and 81D in which positions the shifter gears M3, M6, C4, and C5 are engaged with the free gears M4, M5, M7, C1, C2, C3, and C6 with which the shifter gears M3, M6, C4, and C5 are to be engaged, that is, rear positions Pre and front positions Pfr in the lead grooves 81A, 81B, 81C, and 81D are provided with gap portions 81g that slightly increase width on direction sides where the free gears M4, M5, M7, C1, C2, C3, and C6 with which the shifter gears M3, M6, C4, and C5 are to be engaged are located (rear sides of the rear positions Pre and front sides of the front positions Pfr).

Figure 11:
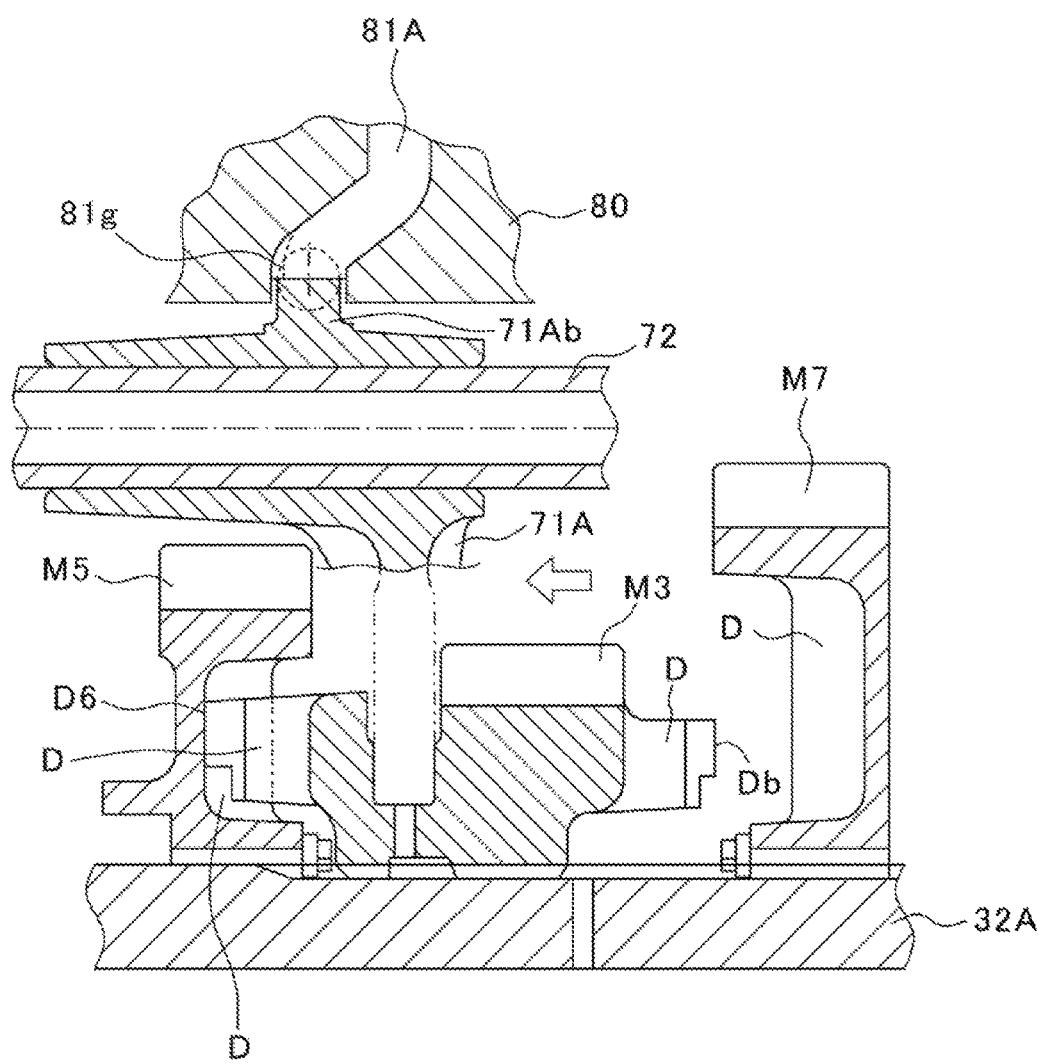
FIG. 11 is a sectional view showing, in a partially simplified manner, a state in which a first shift fork has engaged a third speed driving gear with a fifth speed driving gear.

FIG. 11 is a sectional view showing, in a partially simplified manner, a state in which the first shift fork 71A has engaged the third speed driving gear M3 with the fifth speed driving gear M5.

As described earlier, the end portion Db of the dog tooth D of the third speed driving gear M3 in the present embodiment butts against the fifth speed driving gear M5 at a time of engagement with the dog tooth D of the fifth speed driving gear M5. In this constitution, the action of the reverse tapered dog tooth D causes a thrust force that pushes the third speed driving gear M3 toward the fifth speed driving gear M5 to act on the third speed driving gear M3 at all times. Thus, a thrust force in the same direction also acts on the first shift fork 71A engaging with the third speed driving gear M3. The pin portion 71Ab of the first shift fork 71A is therefore pushed against the side wall of the first lead groove 81A of the shift drum 80. However, in the present embodiment, the first lead groove 81A is provided with the above-described gap portion 81g, so that an excessive load on the pin portion 71Ab is prevented.

As shown in FIG. 7 and FIG. 8, the front end portion 80a of the shift drum 80 is provided with a star-shaped cam 85 that rotates integrally with the shift drum 80. The star-shaped cam 85 is formed on the outer circumference of the rotary member 66c of the pawl ratchet mechanism 66. Recessed portions 86 recessed in the form of a circular arc inward in a radial direction as viewed in the axial direction of the shift drum 80 are formed on an outer circumferential surface (not shown) of the star-shaped cam 85. In the recessed portions 86, bottom positions 86a of the recessed portions 86 which bottom positions have a shortest distance to the rotational center C11 of the shift drum 80 are positioned at the centers of the recessed portions 86. The shape of the recessed portions 86 is symmetric with respect to lines connecting the bottom positions 86a to the rotational center point L3 of the shift drum 80. The recessed portions 86 equal in number to the number of the above-described gear positions GP are evenly arranged on the outer circumferential surface (not shown) of the star-shaped cam 85. In the present embodiment, fifteen recessed portions 86 are evenly arranged at intervals of 24 degrees with the rotational center C11 of the shift drum 80 as a center.

Projecting portions 87 having vertexes 87a projecting outward in the radial direction as viewed in the axial direction of the shift drum 80 are formed between the recessed portions 86. As with the recessed portions 86, the projecting portions 87 are arranged evenly. An angle of 12 degrees is formed between a line connecting the vertex 87a of a projecting portion 87 to the rotational center C11 of the shift drum 80 and another line connecting each of the bottom positions 86a of recessed portions 86 on both sides of the projecting portion 87 to the rotational center C11 of the shift drum 80. The bottom positions 86a of the recessed portions 86 are arranged symmetrically on both sides of the vertex 87a of the projecting portion 87. A cam profile 85Pr of the recessed portions 86 and the projecting portions 87 arranged evenly is thus formed by the outer circumferential surface (not shown) of the star-shaped cam 85.

As shown in FIG. 8, a roller 88a rotatably supported by a detent arm 88b of a detent mechanism 88 biased by a spring not shown in the figure is pressed against the outer circumferential surface (not shown) of the star-shaped cam 85. The rotation of the star-shaped cam 85 is regulated by the abutment of the roller 88a of the detent mechanism 88 against a recessed portion 86, so that a gear position GP of the shift drum 80 is established.

Shift operation of the transmission 31 will be described by taking as an example a shift-up operation from the neutral position P (n-n) to the second speed position P (n-2).

Referring to FIG. 5 and FIG. 10, when the shift drum 80 is at the neutral position P (n-n), the sixth speed driving gear M6 is engaged at the front position with the driven sprocket MT for reverse, whereas the other shifter gears M3, C4, and C5 are at the central positions at which the other shifter gears M3, C4, and C5 are not engaged with free gears FG. As shown in FIG. 8, because the recessed portion 86 of the star-shaped cam 85 which recessed portion 86 corresponds to the neutral position P (n-n) is pressed by the roller 88a, the shift drum 80 is fixed at the neutral position P (n-n). At this time, the first hydraulic clutch 40A and the second hydraulic clutch 40B are not supplied with hydraulic pressure, and neither of the first hydraulic clutch 40A and the second hydraulic clutch 40B is connected.

Referring to FIG. 5 and FIG. 10, when the shift drum 80 is rotated in the shift-up direction from the neutral position P (n-n) by 24 degrees, the pin portion 71Bb of the second shift fork 71B moves rearward to move the sixth speed driving gear M6 to the central position. Simultaneously with this, the pin portion 71Cb of the third shift fork 71C moves rearward to move the fifth speed driven gear C5 to the rear position and mesh the dog tooth D of the fifth speed driven gear C5 with the dog tooth D of the first speed driven gear C1. The shift drum 80 is thus at the first speed position P (1-n) at which the first speed of the transmission 31 is established. In this state, the hydraulic pressure circuit 46 supplies hydraulic pressure to the first hydraulic clutch 40A. A rotational driving force is thereby transmitted in order of the first hydraulic clutch 40A, the first main shaft 32A, the first speed driving gear M1, the first speed driven gear C1, the fifth speed driven gear C5, and the counter shaft 34. Here, referring to FIG. 9, the shift drum 80 is fixed at the first speed position P (1-n) because the roller 88a, which goes over a projecting portion 87 when the star-shaped cam 85 is rotated by 24 degrees, presses the recessed portion 86 of the star-shaped cam 85 which recessed portion 86 corresponds to the first speed position P (1-n).

Next, referring to FIG. 5 and FIG. 10, when the shift drum 80 is further rotated in the shift-up direction from the first speed position P (1-n) by 24 degrees, the pin portion 71Db of the fourth shift fork 71D moves rearward to move the fourth speed driven gear C4 to the rear position and mesh the dog tooth D of the fourth speed driven gear C4 with the dog tooth D of the second speed driven gear C2. The shift drum 80 is thus set at the first speed-second speed preparatory position P (1-2). The shift drum 80 is then fixed at the first speed-second speed preparatory position P (1-2) because the roller 88a presses the recessed portion 86 of the star-shaped cam 85 which recessed portion 86 corresponds to the first speed-second speed preparatory position P (1-2). In this state, the second hydraulic clutch 40B is disconnected, and therefore the path of transmission of the rotational driving force is not changed. Such a state is referred to as "preparatory speed change," which is similarly performed in shift operations from the first speed position P (1-n) to the seventh speed position P (7-n).

When a shift-up operation from the first speed to the second speed is performed in the state of the first speed-second speed preparatory position P (1-2), an operation of switching the hydraulic clutch 40 is performed in which the hydraulic pressure circuit 46 disconnects the first hydraulic clutch 40A and connects the second hydraulic clutch 40B. As a result of this switching operation, shifting up to the second speed is performed smoothly without a so-called torque loss. A rotational driving force is transmitted in order of the second hydraulic clutch 40B, the second main shaft 32B, the second speed driving gear M2, the second speed driven gear C2, the fourth speed driven gear C4, and the counter shaft 34.

Then, the shift drum 80 is further rotated in the shift-up direction by 24 degrees, and thus the pin portion 71Cb of the third shift fork 71C moves frontward to move the fifth speed driven gear C5 to the central position. The shift drum 80 is therefore set at the second speed position P (n-2) at which the second speed of the transmission 31 is established. At this time, the shift drum 80 is fixed at the second speed position P (n-2) because the roller 88a presses the recessed portion 86 of the star-shaped cam 85 which recessed portion 86 corresponds to the second speed position P (n-2).

As shown in FIG. 7, the first sensor shaft 83 rotating integrally with the shift drum 80 extends forward from the center of the front end portion 80a of the shift drum 80. The above-described pawl ratchet mechanism 66 is provided to an axially central portion 83b of the first sensor shaft 83. An end portion 83a of the first sensor shaft 83 passes through an opening portion 23a formed in the change system holder 23, and is connected to the first angle sensor 84 that detects the rotational angle of the first sensor shaft 83 and the shift drum 80. The first angle sensor 84 is formed by a potentiometer, for example. The first angle sensor 84 is attached to the front surface of the change system holder 23. The first angle sensor 84 outputs, to an ECU (not shown), an output value Vout1 of a voltage output on the basis of the rotational angle of the first sensor shaft 83 rotating integrally with the shift drum 80.

The speed increasing mechanism 90 that increases the amount of rotation of the first sensor shaft 83 at a predetermined speed increasing ratio Ra is provided in front of the shift drum 80. The speed increasing mechanism 90 includes a speed increasing driving gear 91 as a speed increasing drive member, a second sensor shaft 92, and a speed increasing driven gear 93 as a speed increasing driven member.

The speed increasing driving gear 91 is fitted between the pawl ratchet mechanism 66 and the change system holder 23 in the axial direction of the first sensor shaft 83 in such a manner as to be non-rotatable relative to the first sensor shaft 83, and is rotated integrally with the first sensor shaft 83. A thick flange portion 91a is formed on the outer peripheral edge of the speed increasing driving gear 91. A pin 95 is press-fitted between the flange portion 91a of the speed increasing driving gear 91 and the first sensor shaft 83.

The second sensor shaft 92 is disposed on the right of the first sensor shaft 83 and circumferentially outward of the speed increasing driving gear 91. The second sensor shaft 92 has a rotation axis L4 oriented in the forward-rearward direction such that the axial direction of the second sensor shaft 92 is parallel with the rotational center C11 of the first sensor shaft 83. The second sensor shaft 92 has a front end portion 92a rotatably supported in an opening portion 23b formed in the change system holder 23 via a ball bearing 96a, and has a rear end portion 92b rotatably supported by the transmission holder 22 via a ball bearing 96b.

The speed increasing driven gear 93 is formed integrally with the circumferential surface of the second sensor shaft 92 in a circumferential direction which circumferential surface is in the vicinity of a front end portion 92a of the second sensor shaft 92. The speed increasing driven gear 93 has a smaller diameter than the speed increasing driving gear 91. The speed increasing driven gear 93 is disposed so as to mesh with the speed increasing driving gear 91 at all times. The speed increasing driven gear 93 is driven by the speed increasing driving gear 91. The speed increasing ratio Ra of the speed increasing driven gear 93 to the speed increasing driving gear 91 in the speed increasing mechanism 90 is set at the value of one of divisors of the above-described number of gear positions GP of the shift drum 80 other than one, and is always a positive integer. In the present embodiment, "15," which is the same as the number of the gear positions GP, is the speed increasing ratio Ra. Thus, the second sensor shaft 92 is rotated once each time a change is made by one gear position GP, and the second sensor shaft 92 is rotated 15 times when the shift drum 80 is rotated once.

The second angle sensor 94 is connected to the front end portion 92a of the second sensor shaft 92, the second angle sensor 94 detecting the rotational angle of the second sensor shaft 92 rotated by an amount increased from the amount of rotation of the first sensor shaft 83 at the predetermined speed increasing ratio Ra by the speed increasing mechanism 90. The second angle sensor 94 is formed by a potentiometer, for example. The second angle sensor 94 is attached to the front surface of the change system holder 23. The second angle sensor 94 detects the rotational angle of the second sensor shaft 92, and outputs, to the ECU, an output value Vout2 of a voltage output on the basis of the rotational angle of the second sensor shaft 92.

As shown in FIG. 4 and FIG. 7, a neutral switch 97 and a reverse position switch 98 are provided to the front surface of the change system holder 23. The neutral switch 97 is disposed on the circulating track of the pin 95 in the speed increasing driving gear 91, and the reverse position switch 98 is disposed on the circulating track of the flange portion 91a of the speed increasing driving gear 91, so that the neutral position P (n-n) and the reverse position P (RVS) of the shift drum 80 are detected.

Figure 12:
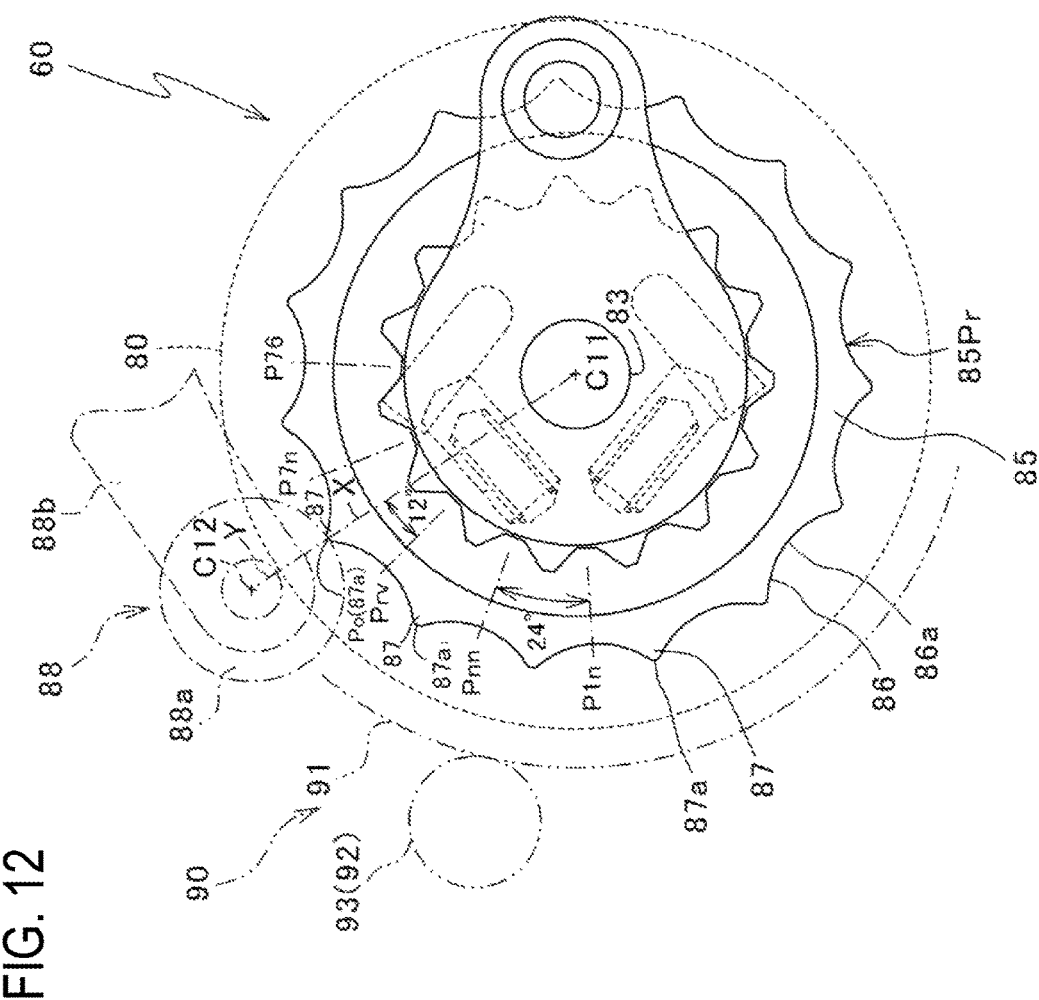
FIG. 12 is an imaginary diagram showing an imaginary reference state of each angle sensor with a part omitted.

FIG. 12 is an imaginary diagram showing an imaginary reference state in which the first and second angle sensors 84 and 94 detect a rotational angle of zero degrees. In FIG. 12, from the shape of the lead grooves 81 of the shift drum 80, the detent mechanism 88 does not abut against a position shown in FIG. 12 (reference point Po to be described later). However, in order to illustrate the imaginary reference state of the first angle sensor 84 and the second angle sensor 94, FIG. 12 imaginarily shows the detent mechanism 88 by alternate long and short dashed lines.

As shown in FIG. 12, in the present embodiment, the vertex 87a of the projecting portion 87 located between the recessed portion 86 of the star-shaped cam 85 which recessed portion corresponds to the seventh speed position P (7-n) and the recessed portion 86 corresponding to the reverse position P (RVS) is set as a reference point Po in the imaginary state in which the vertex 87a abuts against the roller 88a of the detent mechanism 88. An offset is applied to the output values Vout1 and Vout2 of the first and second angle sensors 84 and 94, and the first angle sensor 84 is connected to the first sensor shaft 83 and the second angle sensor 94 is connected to the second sensor shaft 92, such that the first and second angle sensors 84 and 94 detect a rotational angle of zero degrees in the state shown in FIG. 12 (which state will hereinafter be referred to as an "imaginary reference state") as a state in which a reference line X connecting the rotational center C11 of the shift drum 80 to the reference point Po coincides with a detection line Y connecting the rotational center C11 of the shift drum 80 to the rotational center C12 of the roller 88a of the detent mechanism 88. Incidentally, the vertex 87a of another projecting portion 87 may be set as the reference point Po. In the present embodiment, however, the reference point Po is set in the state shown in FIG. 12 in consideration of effects of hunting of the output values of the angle sensors as will be described later.

Figure 13:
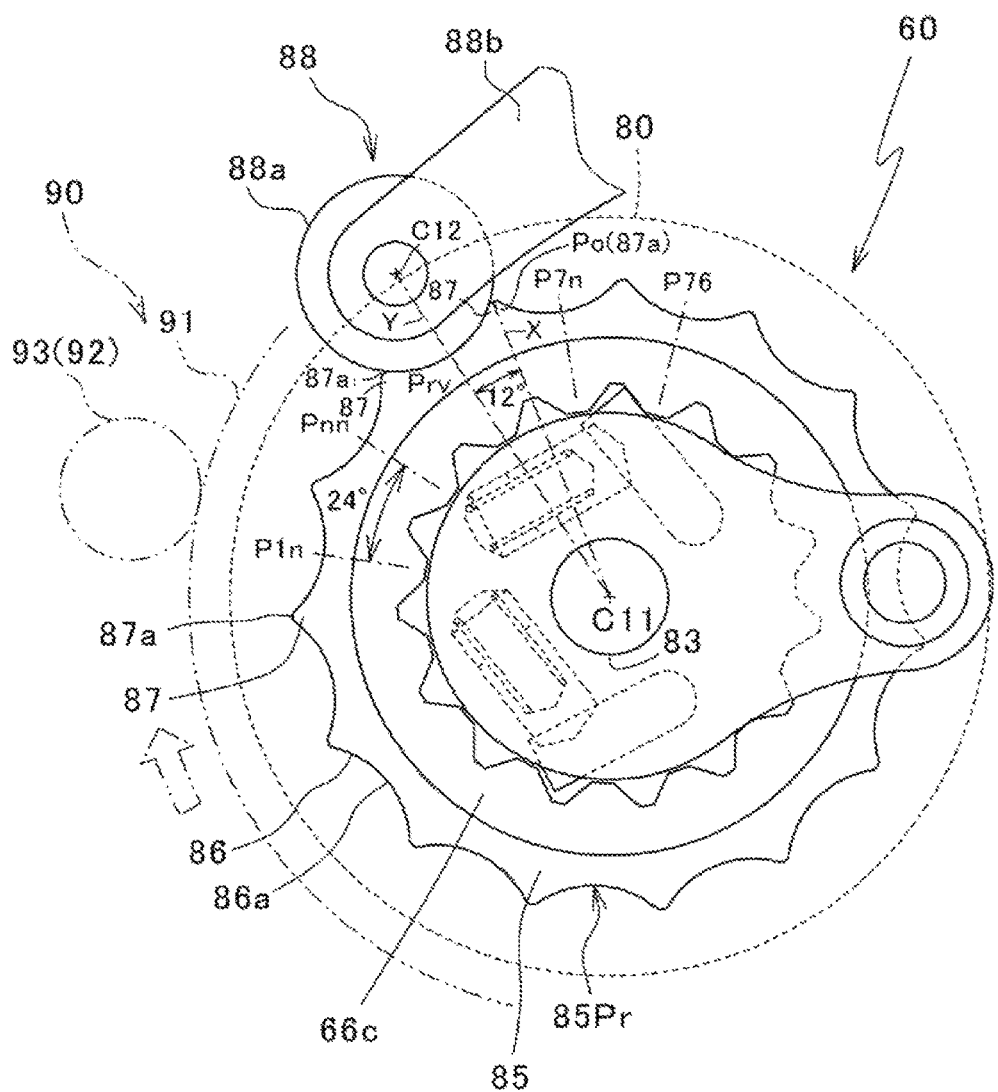
FIG. 13 is a diagram showing a state in which a first gear position of the shift drum is established after a rotation in the shift-up direction from the state of FIG. 12.

FIG. 13 is a diagram showing a state in which the first gear position of the shift drum is established after a rotation in the shift-up direction from the state of FIG. 12. After the star-shaped cam 85 is rotated clockwise (shift-up direction) in FIG. 12, the roller 88a abuts against the recessed portion 86 corresponding to the reverse position P (RVS), whereby the reverse position P (RVS) as the first gear position GP is established, as shown in FIG. 13. In the present embodiment, as described earlier, the shape of the recessed portion 86 is formed so as to be symmetric with respect to the central bottom position 86a. Thus, the reverse position P (RVS) is established when the bottom position 86a of the recessed portion 86 is positioned on the detection line Y. At this time, the shift drum 80, the star-shaped cam 85, and the first sensor shaft 83 rotated integrally with each other are rotated in the shift-up direction by 12 degrees from the imaginary reference state shown in FIG. 12. In addition, the second sensor shaft 92 is rotated by 180 degrees, to which the speed increasing mechanism 90 increases the amount of rotation of the first sensor shaft 83 (that is, the shift drum 80) fifteen times. Thus, each gear position GP is sequentially established each time the shift drum 80 is rotated by 24 degrees from the position at which the shift drum 80 is rotated in the shift-up direction by 12 degrees from the imaginary reference state. An angle θ between the reference line X and the detection line Y with the rotational center C11 of the shift drum 80 as a center is the rotational angle of the shift drum 80 from the imaginary reference state.

Figure 14:
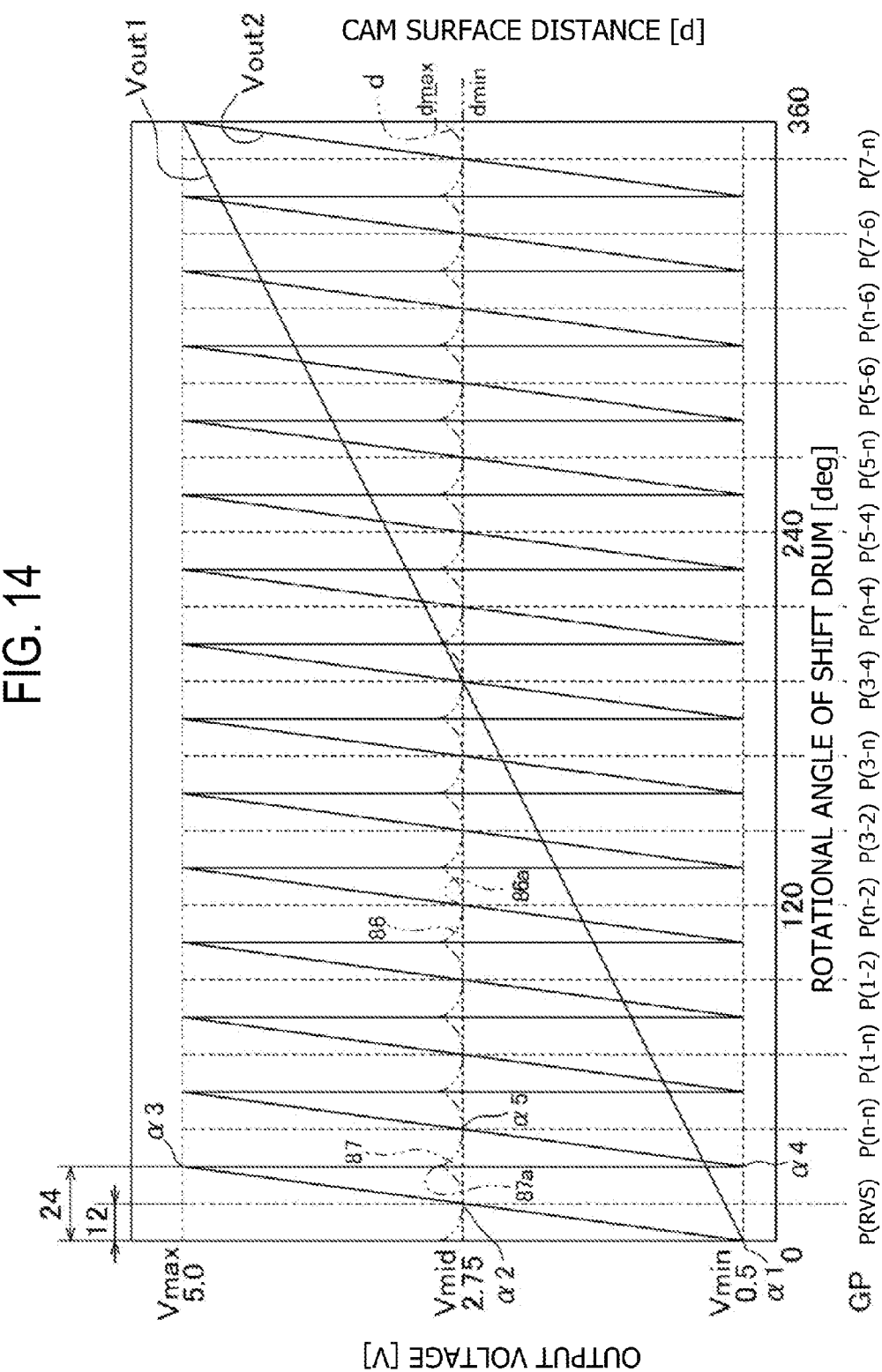
FIG. 14 is a profile diagram of the output value of a first angle sensor and the output value of a second angle sensor for each gear position of the shift drum.

FIG. 14 is an output profile diagram of the output value Vout1 of the first angle sensor 84 and the output value Vout2 of the second angle sensor 94 in each gear position GP of the shift drum 80. In FIG. 14, solid lines represent the output value Vout1 of the first angle sensor 84 and the output value Vout2 of the second angle sensor 94. A chain double-dashed line indicates a distance d from the rotational center C11 of the shift drum 80 to the outer circumferential surface (not shown) of the star-shaped cam 85 in the detection line Y (which distance will hereinafter be referred to as a "cam surface distance"). This value changes on the basis of the rotational angle of the shift drum 80 and the shape of the cam profile 85Pr. In addition, a first axis of ordinates indicates the output voltages output from the respective angle sensors 84 and 94. A second axis of ordinates indicates the cam surface distance d of the star-shaped cam 85 in the detection line Y. An axis of abscissas indicates the rotational angle of the shift drum 80 when the star-shaped cam 85 is rotated in the shift-up direction of the shift drum 80 from the imaginary reference state. Each gear position GP of the shift drum 80 is shown below the axis of abscissas.

As shown in FIG. 14, the output value Vout1 of the first angle sensor 84 is a minimum value Vmin at the time of 0 degrees when the shift drum 80 is in the imaginary reference state in which the reference line X and the detection line Y coincide with each other, and the output value Vout1 of the first angle sensor 84 is a maximum value Vmax when the shift drum 80 has been rotated by 360 degrees (rotated once) from the imaginary reference state. The output value Vout1 of the first angle sensor 84 linearly changes between the minimum value Vmin and the maximum value Vmax.

On the other hand, the second sensor shaft 92 rotated by an amount increased from the amount of rotation of the first sensor shaft 83 (that is, the shift drum 80) by the speed increasing mechanism 90 is rotated by 360 degrees when the shift drum 80 is rotated by 24 degrees. Hence, the output value Vout2 of the second angle sensor 94 is the minimum value Vmin at the time of 0 degrees at which time the shift drum 80 is in the imaginary reference state, and the output value Vout2 of the second angle sensor 94 is the maximum value Vmax when the shift drum 80 has been rotated by 24 degrees from the imaginary reference state. The output value Vout2 of the second angle sensor 94 linearly changes between the minimum value Vmin and the maximum value Vmax. When the shift drum 80 is rotated once, the second sensor shaft 92 is rotated 15 times, and therefore a cycle from the minimum value Vmin to the maximum value Vmax is repeated 15 times.

Incidentally, in the present embodiment, the minimum value Vmin of each of the output values Vout1 and Vout2 is 0.5 V, and the maximum value Vmax of each of the output values Vout1 and Vout2 is 5.0 V.

Next, referring to FIG. 14, description will be made of changes in the output value Vout2 of the second angle sensor 94 by taking as an example the rotation of the shift drum 80 from the imaginary reference state to the neutral position P (n-n).

First, when the shift drum 80 is in the imaginary reference state shown in FIG. 12, the output value Vout2 is the minimum value Vmin (state denoted by α1 in FIG. 14). Then, when the shift drum 80 is rotated by 12 degrees in the shift-up direction from the imaginary reference state, the roller 88a abuts against the recessed portion 86 corresponding to the reverse position P (RVS), and thus the reverse position P (RVS) is established, as shown in FIG. 13. In this state, the output value Vout2 is a middle value between the minimum value Vmin and the maximum value Vmax (which middle value will hereinafter be referred to as a "median value Vmid") ($\alpha2$), and the cam surface distance d of the star-shaped cam 85 is a minimum value dmin. That is, a gear position GP is established, and the bottom position 86a of the recessed portion 86 is located on the detection line Y.

Incidentally, in the present specification and claims, the "median value Vmid" means the middle value between the minimum value Vmin and the maximum value Vmax of the output value Vout2 of the second angle sensor 94. In the present embodiment, the minimum value Vmin is 0.5 V, and the maximum value Vmax is 5.0 V. The median value Vmid is thus 2.75 V.

Next, when the shift drum 80 is rotated in the shift-up direction by 12 degrees from the reverse position P (RVS), the roller 88a abuts against the vertex $87a_1$ of the projecting portion 87 located between the recessed portion 86 corresponding to the reverse position P (RVS) and the recessed portion 86 corresponding to the neutral position P (n-n). In this state, the output value Vout2 is in the timing of switching between the maximum value Vmax and the minimum value Vmin ($\alpha3$ and $\alpha4$), and the cam surface distance d of the star-shaped cam 85 is a maximum value dmax. Then, when the shift drum 80 is further rotated by 12 degrees in the shift-up direction, the roller 88a abuts against the recessed portion 86 corresponding to the neutral position P (n-n), and thus the neutral position P (n-n) is established. In this state, the output value Vout2 is the median value Vmid as the middle value between the minimum value Vmin and the maximum value Vmax ($\alpha5$), and the cam surface distance d of the star-shaped cam 85 is the minimum value dmin (that is, the bottom position 86a of the recessed portion 86 is located on the detection line Y). Thereafter, when the roller 88a abuts against the recessed portions 86 and each gear position GP is established, the output value Vout2 of the second angle sensor 94 is the median value Vmid, and the cam surface distance d of the star-shaped cam 85 is the minimum value dmin. In addition, in timing in which the roller 88a abuts against the vertexes 87a of the projecting portions 87, the output value Vout2 switches, and the cam surface distance d of the star-shaped cam 85 is the maximum value dmax.

Thus, the second angle sensor 94 is connected to the second sensor shaft 92 such that the output value Vout2 when a gear position GP is established by the abutment of the roller 88a against a recessed portion 86 and the cam surface distance d is the minimum value dmin is the median value Vmid and such that the output value Vout2 when the roller 88a abuts against the vertex 87a of a projecting portion 87 and the cam surface distance d is the maximum value dmax is in timing of switching between the minimum value Vmin and the maximum value Vmax.

In general, the output value of a rotational angle sensor is output according to the rotational angle of a sensor shaft. The output value of the rotational angle sensor is a minimum value when the rotational angle is 0 degrees, and becomes a maximum value when a rotation has been made by 360 degrees from the minimum value. The output value of the rotational angle sensor switches between the minimum value and the maximum value when the rotation by 360 degrees has been made. In the timing of this switching, the output value varies widely, and also tends to be affected by hunting. Therefore the output value may be unstable. On the other hand, the output value of the rotational angle sensor is most stable when the output value of the rotational angle sensor is a median value located in the middle between the minimum value and the maximum value. Because an accuracy of detection of the sensor is required particularly at a recessed portion 86 where a gear position GP is established, it is desirable that the output value be obtained stably.

In the present embodiment, the median value Vmid is output as the output value Vout2 of the second angle sensor 94 when a gear position GP of the shift drum 80 is established by the abutment of the roller 88a against a recessed portion 86 of the star-shaped cam 85 and the cam surface distance d of the star-shaped cam 85 is the minimum value dmin. In the present embodiment, when the bottom position 86a of the recessed portion 86 is positioned on the detection line Y, a gear position GP is established, and a rotation of the shift drum 80 is completed. The output value Vout2 of the second angle sensor 94 at this time is the median value Vmid, and is thus stable. The completion of a rotation of the shift drum 80 which rotation is end with a gear position GP established can therefore be detected accurately.

In addition, the output value Vout2 of the second angle sensor 94 when the roller 88a abuts against the vertex 87a of a projecting portion 87 and the cam surface distance d of the star-shaped cam 85 is the maximum value dmax is in timing of switching between the minimum value Vmin and the maximum value Vmax. That is, the bottom position 86a of a recessed portion 86 where a gear position GP of the shift drum 80 is established is a position most distant from both of a certain switching timing of the output value Vout2 and a next switching timing. It is therefore possible to eliminate a fear of a decrease in accuracy of detection of the rotational angle of the shift drum 80 when a gear position GP is established.

Figure 15:
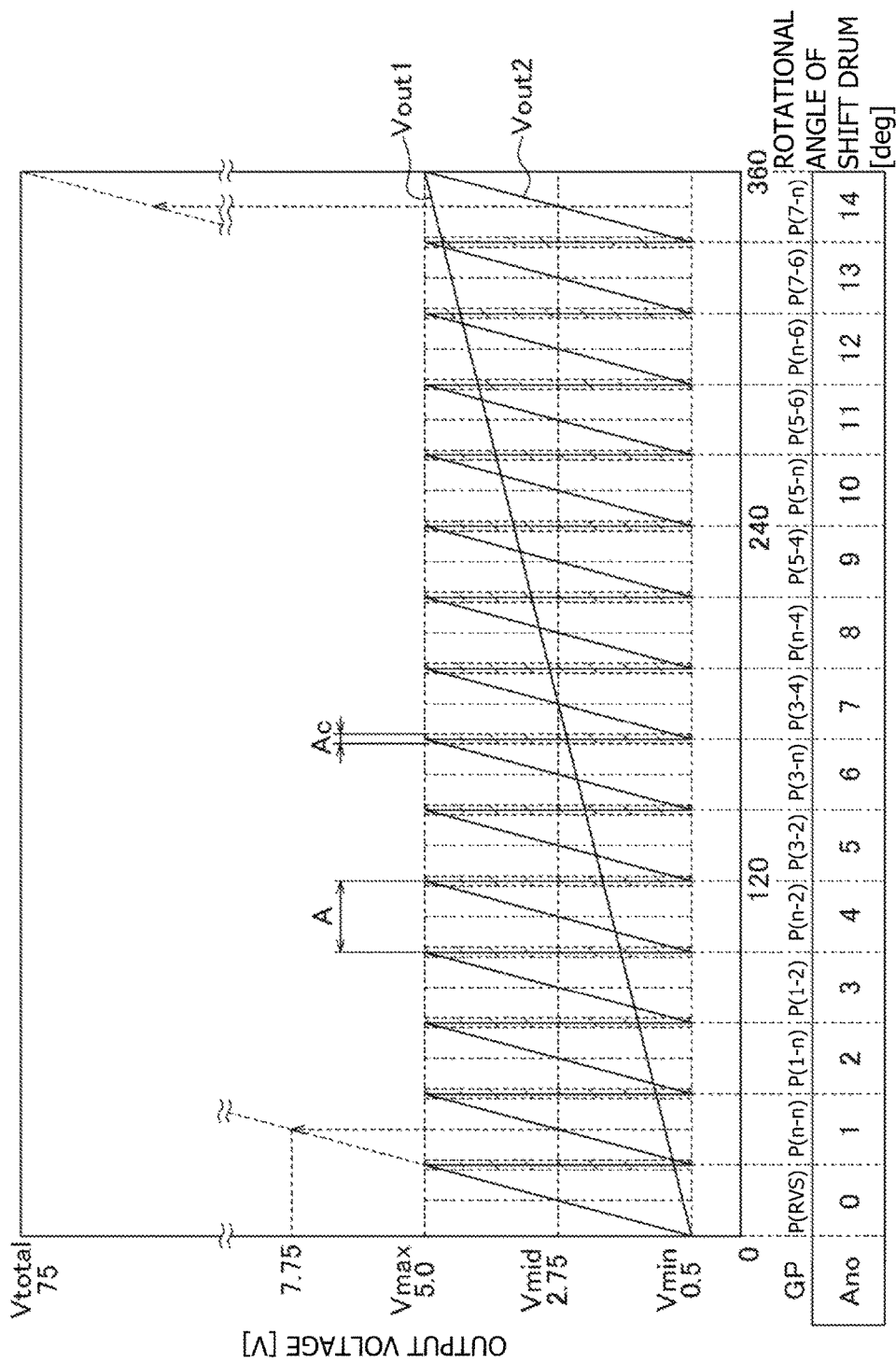
FIG. 15 is a diagram of assistance in explaining a method of detecting the rotational angle of the shift drum by the shift drum angle detecting device according to the embodiment of the present invention.
Figure 16:
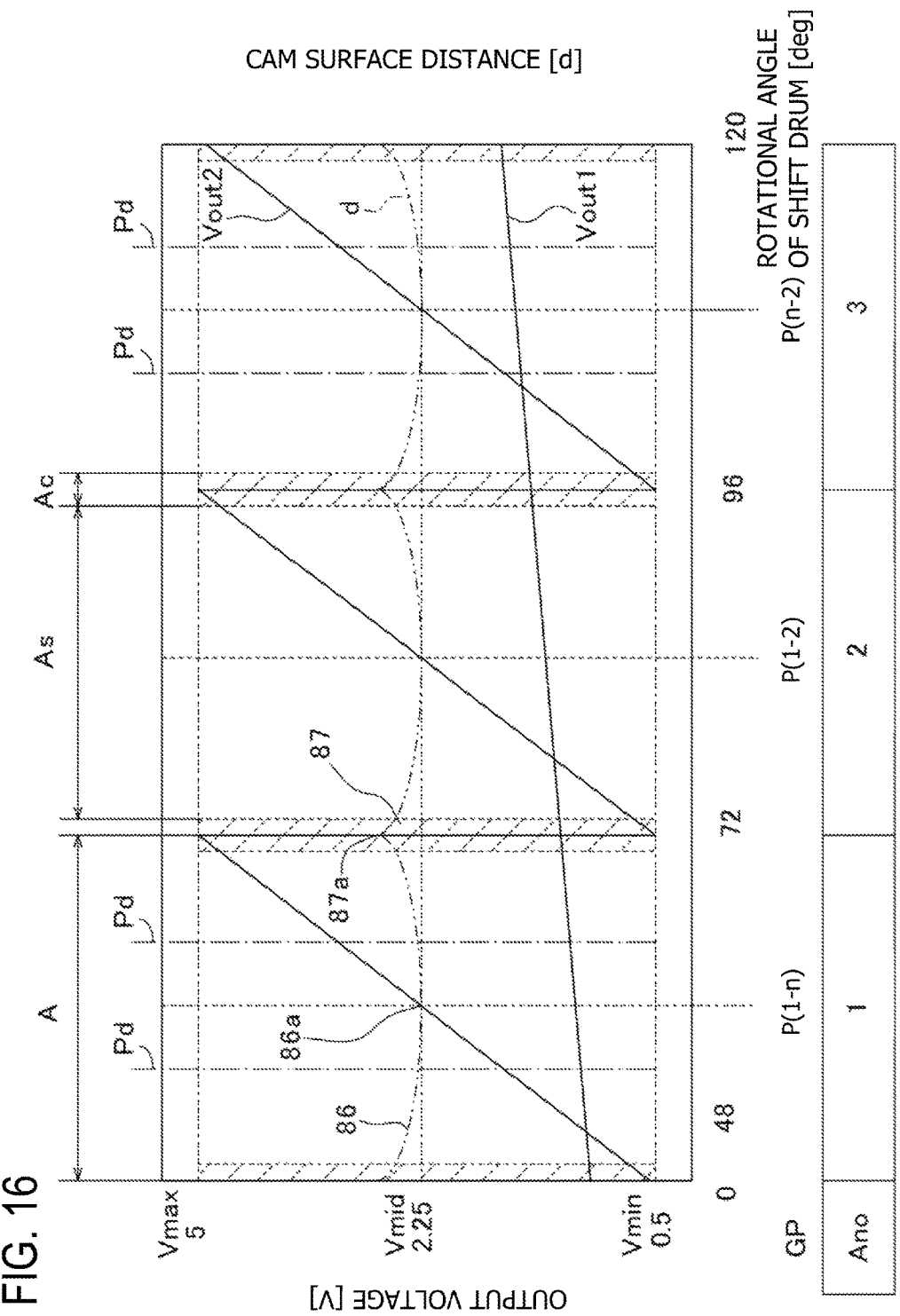
FIG. 16 is a fragmentary enlarged view in which a part of FIG. 15 is enlarged.

FIG. 15 is a diagram of assistance in explaining a method of detecting the rotational angle of the shift drum 80 by the shift drum angle detecting device 100 according to the embodiment of the present invention. FIG. 16 is a fragmentary enlarged view in which a part of FIG. 15 is enlarged.

In the figures, solid lines respectively represent the output value Vout1 of the first angle sensor 84 and the output value Vout2 of the second angle sensor 94. An axis of ordinates indicates output voltage. An axis of abscissas indicates the rotational angle of the shift drum 80 when the star-shaped cam 85 is rotated in the shift-up direction from the imaginary reference state. Each gear position GP of the shift drum 80 and area numbers Ano to be described later are shown below the axis of abscissas. Alternate long and short dashed lines in FIG. 16 indicate dog abutment occurrence positions Pd when so-called dog abutment to be described later occurs.

Incidentally, in the present embodiment, the output values Vout1 and Vout2 of the first and second angle sensors 84 and 94 are output at intervals of 10 milliseconds.

As shown in FIG. 15, a range of the rotational angle of the shift drum 80 which rotational angle is detected in a measuring range of one cycle from the minimum value Vmin to the maximum value Vmax of the output value Vout2 of the second angle sensor 94 is set as one area A. The number of areas A changes according to the speed increasing ratio Ra of the speed increasing mechanism 90. For example, in the present embodiment, the speed increasing ratio Ra is set at "15," and therefore the number of areas is "15." In addition, as described earlier, the output value Vout2 when a gear position GP is established is the median value Vmid, and one gear position GP is established within each area A.

The areas A are assigned integers as area numbers Ano corresponding to the respective areas A. In the present embodiment, the area numbers Ano are assigned starting with "0" in order of arrangement of the gear positions GP established within the areas A. The area numbers Ano are assigned in order of arrangement of the gear positions GP established when the shift drum 80 is rotated in the shift-up direction from the imaginary reference state. The area number Ano of the area A in which the reverse position P (RVS) is established is "0." The area number Ano of the area A in which the neutral position P (n-n) is established is "1." The area number Ano of the area A in which the seventh speed position P (7-n) is established is "14."

As shown in FIG. 15 and FIG. 16, there is a timing between areas A in which timing the output value Vout2 of the second angle sensor 94 switches between the minimum value Vmin and the maximum value Vmax. In this timing, the output value Vout2 instantaneously switches between the minimum value Vmin and the maximum value Vmax. Thus, a phenomenon occurs in which the output value Vout2 switches between the minimum value Vmin and the maximum value Vmax according to a tolerance or an error of the second angle sensor 94, and the output value Vout2 may be affected by hunting until the output value Vout2 becomes stable. Within the entire range of the rotational angle of the shift drum 80, a region in which an angle of a predetermined width is provided to a rotational angle of the shift drum 80 in such switching timing of the output value Vout2 of the second angle sensor 94 is set as a switching area Ac. A region other than switching areas Ac within each area A is set as a linear area As. A switching area Ac is provided with a width of one degree in each of a shift-up direction and a shift-down direction with the angle of the switching timing as a center, for example. A purpose of setting the switching areas Ac is to prevent the switching areas Ac from affecting the detection of the rotational angle of the shift drum 80, as will be described later in detail.

The output value Vout1 of the first angle sensor 84 linearly increases from the minimum value Vmin to the maximum value Vmax during one rotation of the shift drum 80. In addition, linear areas As and switching areas Ac appear alternately during one rotation of the shift drum 80. Therefore, a region including the present rotational angle of the shift drum 80 can be determined on the basis of the output value Vout1 of the first angle sensor 84.

The output value Vout1 of the first angle sensor 84 is used to determine whether or not the rotational angle of the shift drum 80 is within a switching area Ac. Incidentally, the output value Vout2 of the second angle sensor 94 may also be used for this determination.

Next, when the rotational angle of the shift drum 80 is not within a switching area Ac, that is, when the rotational angle of the shift drum 80 is within a linear area As, an area determination is made which determines an area A in which a present gear position GP is established, by using the output value Vout1 of the first angle sensor 84. In this area determination, an area table stored in a storage area within the ECU or the like in advance is read out, and a present area number Ano determined from the output value Vout1 of the first angle sensor 84 is extracted. In the present embodiment, when the output value Vout1 of the first angle sensor 84 is 2.75 V, for example, the area number Ano is "7," and the established gear position GP is the third speed-fourth speed preparatory position P (3-4).

Next, an output voltage Vout for controlling the rotational angle of the shift drum 80 is calculated using the output value Vout2 of the second angle sensor 94. The following equation, for example, is used for this calculation.

$$Vout = Vout2 + Ano \times 5$$

When a state in which the neutral position P (n-n) is established as a gear position GP is taken as an example for description, the area number Ano is "1," the output value Vout2 of the second angle sensor 94 is 2.75 V, and the output voltage Vout is 7.75 V.

When the output value Vout2 of the second angle sensor 94 is located within a switching area Ac, the output voltage Vout for controlling the rotational angle of the shift drum 80 is calculated by using the following equation, for example, in order to avoid effects of the above-described hunting and the like.

$$Vout = Vout(t-1) + 15 \times [Vout1(t) - Vout1(t-1)]$$

where $Vout(t-1)$ denotes the output voltage Vout calculated in a previous timing (10 milliseconds ago), $Vout1(t-1)$ denotes the output value Vout1 of the first angle sensor 84 which output value was detected in the previous timing (10 milliseconds ago), and $V(t)$ denotes the output value Vout1 of the first angle sensor 84 which output value is detected in a present timing. The output voltage Vout for controlling the rotational angle of the shift drum 80 is thus calculated within a switching area Ac by using the output value Vout1 of the first angle sensor 84. It is therefore possible to detect the rotational angle of the shift drum 80 accurately without being affected by a tolerance or an error of the second angle sensor 94 and hunting as described above.

Because the rotational angle of the shift drum 80 is detected by using the thus calculated output voltage Vout, a wide output range up to a maximum of 75 V can be used to detect the rotational angle of the shift drum 80 as compared with a case where the rotational angle of the shift drum 80 is detected by the first angle sensor 84 alone. Therefore the rotational angle of the shift drum 80 can be detected accurately.

In addition, because the rotational angle of the shift drum 80 is controlled by using the thus calculated output voltage Vout, a value of the rotational angle of the shift drum 80 which rotational angle can be controlled by the output voltage Vout in units of 1 V can be set small as compared with a case where the first angle sensor 84 alone is used to control the rotational angle of the shift drum 80. For example, in the present embodiment, the rotational angle of the shift drum 80 which rotational angle can be controlled per volt of the output voltage is 4.8 degrees. Thus, accuracy of control of the rotational angle of the shift drum 80 can be improved.

Incidentally, in the transmission 31 of a dog clutch type using dog teeth D, at a time of shift operation, so-called dog abutment may occur in which the dog tooth D of a shifter gear SG does not go into a dog hole of a free gear FG (and the driven sprocket MT) with which the dog tooth D of the shifter gear SG is to be engaged but the end portion Db of the dog tooth D of the shifter gear SG abuts against the end portion Db of the dog tooth D of the free gear FG with which the dog tooth D of the shifter gear SG is to be engaged. As indicated by the alternate long and short dashed lines in FIG. 16, in the present embodiment, the second angle sensor 94 is connected to the second sensor shaft 92 such that the output value Vout2 output at a dog abutment occurrence position Pd when the dog abutment occurs is an output value Vout2 in a linear area As and is not an output value Vout2 in a switching area Ac. Therefore, whether or not dog abutment has occurred can also be detected accurately.

Figure 17:
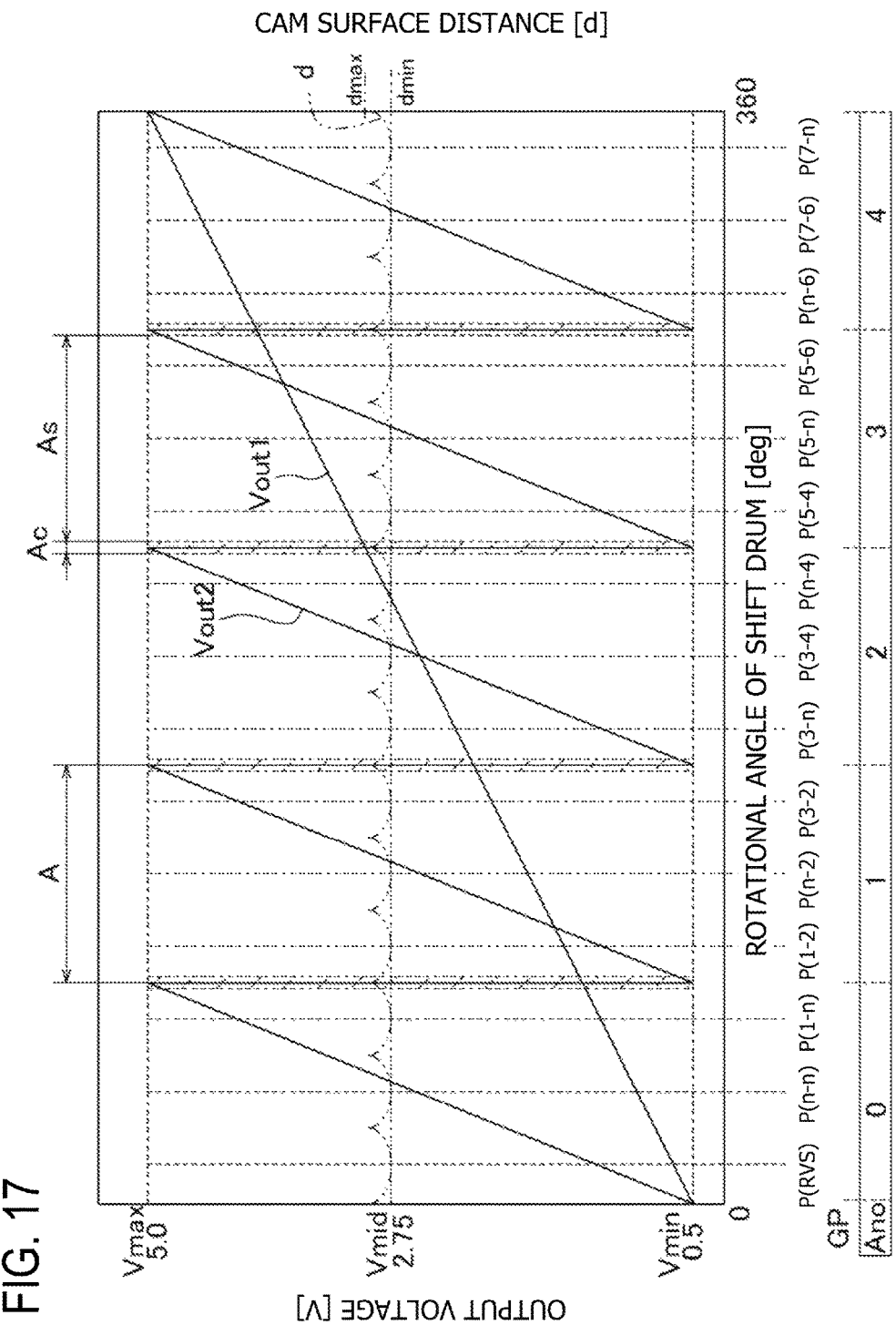
FIG. 17 is an output profile diagram of the output value of the first angle sensor and the output value of the second angle sensor in a first modification of the shift drum angle detecting device according to the embodiment of the present invention.

FIG. 17 is an output profile diagram of the output value Vout1 of the first angle sensor 84 and the output value Vout2 of the second angle sensor 94 in a first modification of the shift drum angle detecting device 100 according to the embodiment of the present invention. Details in FIG. 17 are similar to those of FIG. 13.

The first modification is different from the embodiment in that the speed increasing ratio Ra of the speed increasing mechanism 90 is set at "5" in the first modification. In the first modification, because the speed increasing ratio Ra is set at "5," the number of areas A is "5." Three gear positions GP are established within each area A. When the method of calculating the rotational angle of the shift drum 80 is applied as in the embodiment, because the number of areas A is "5," an output range up to a maximum of 25 V is used to detect the rotational angle of the shift drum 80, and the rotational angle of the shift drum 80 which rotational angle can be controlled per volt of the output voltage is 14.4 degrees.

Figure 18:
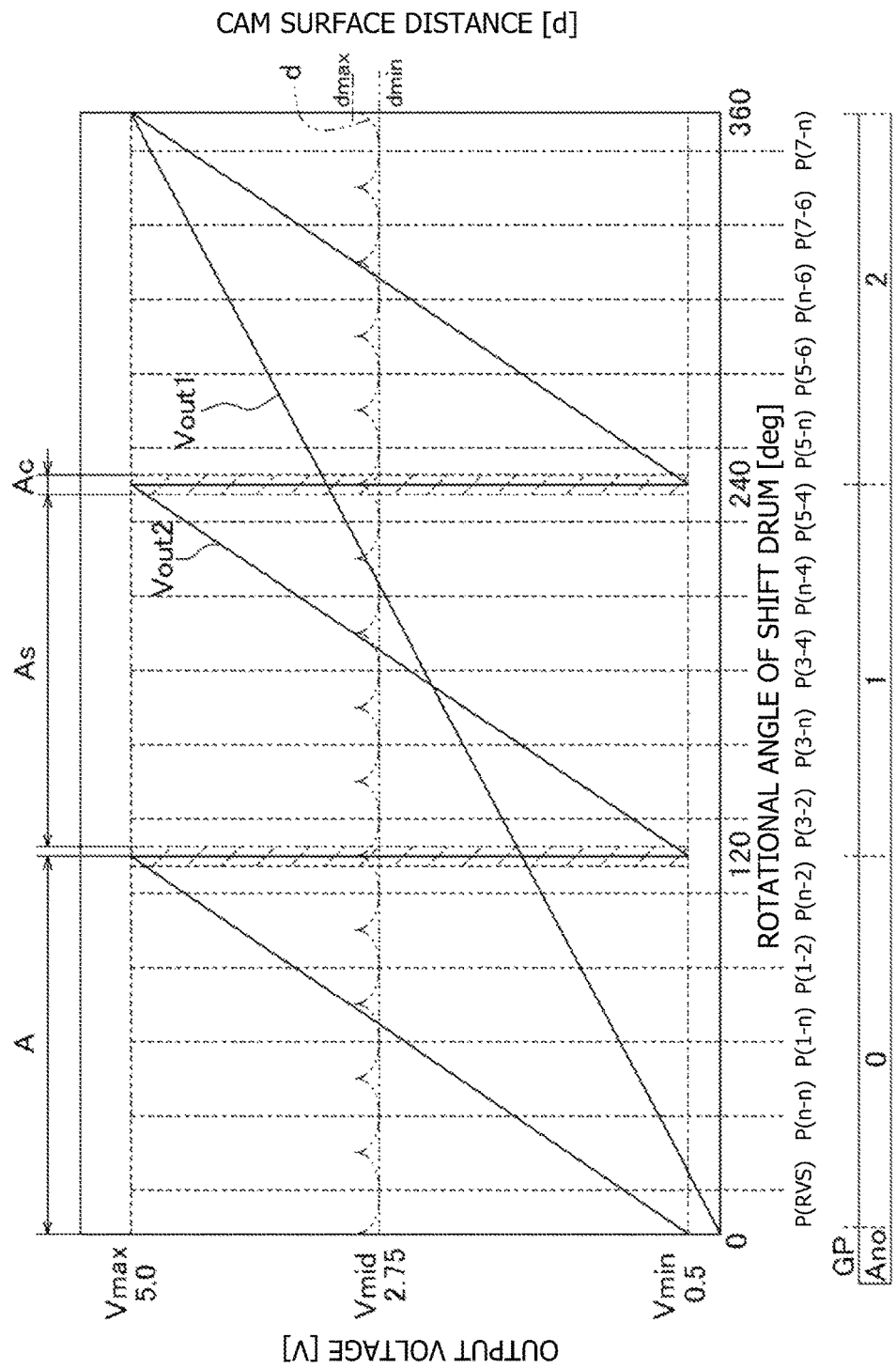
FIG. 18 is an output profile diagram of the output value of the first angle sensor and the output value of the second angle sensor in a second modification of the shift drum angle detecting device according to the embodiment of the present invention.

FIG. 18 is an output profile diagram of the output value Vout1 of the first angle sensor 84 and the output value Vout2 of the second angle sensor 94 in a second modification of the shift drum angle detecting device 100 according to the embodiment of the present invention. Details in FIG. 18 are similar to those of FIG. 12.

The second modification is different from the embodiment in that the speed increasing ratio Ra of the speed increasing mechanism 90 is set at "3" in the second modification. In the second modification, because the speed increasing ratio Ra is set at "3," the number of areas A is set at "3." Five gear positions GP are established within each area A. When the method of calculating the rotational angle of the shift drum 80 is applied as in the embodiment, because the number of areas A is "3," an output range up to a maximum of 15 V is used to detect the rotational angle of the shift drum 80, and the rotational angle of the shift drum 80 which rotational angle can be controlled per volt of the output voltage is 24 degrees.

Figure 19:
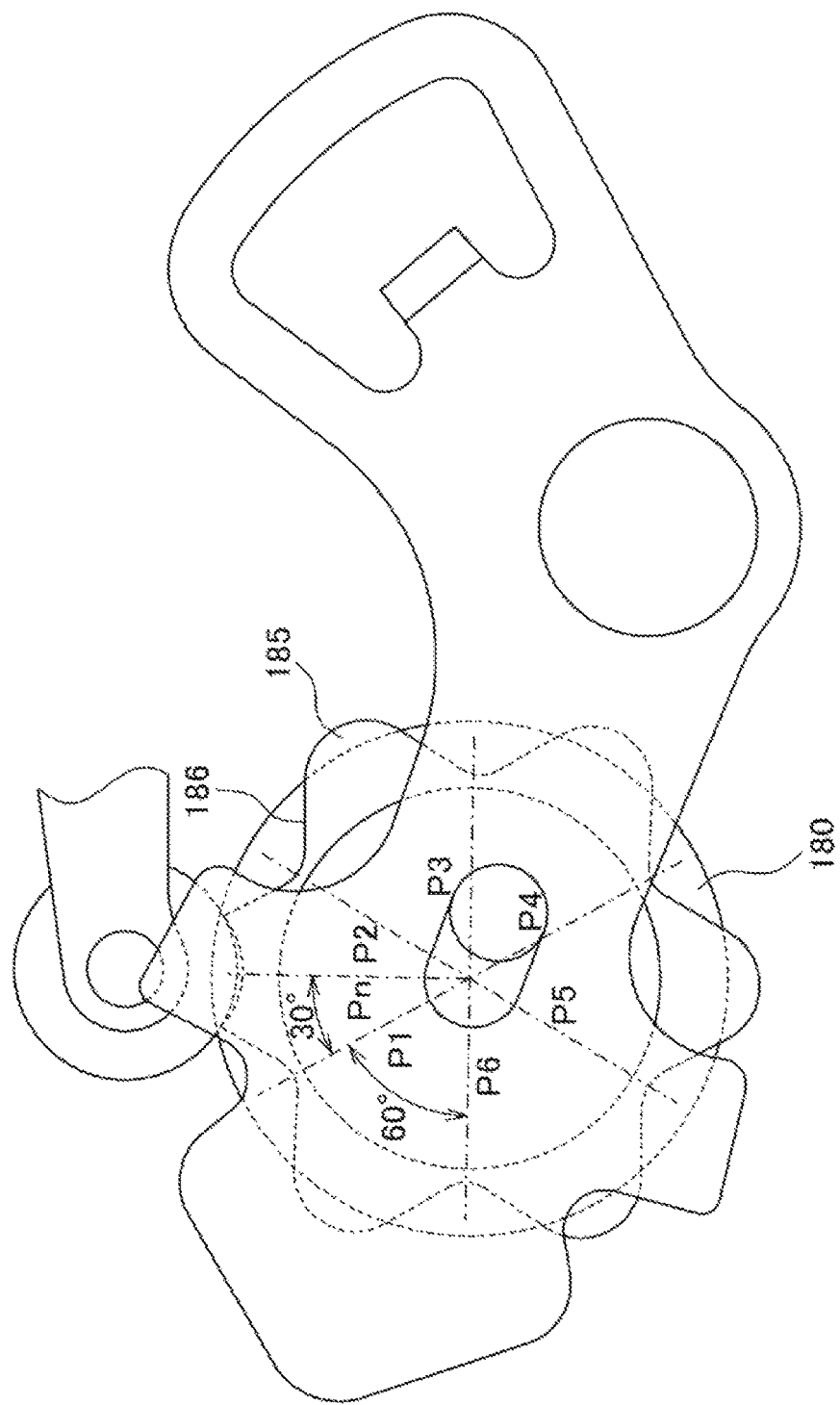
FIG. 19 shows a reference example of a star-shaped cam of a shift drum in a transmission of a six-speed single clutch type used conventionally.
Figure 20:
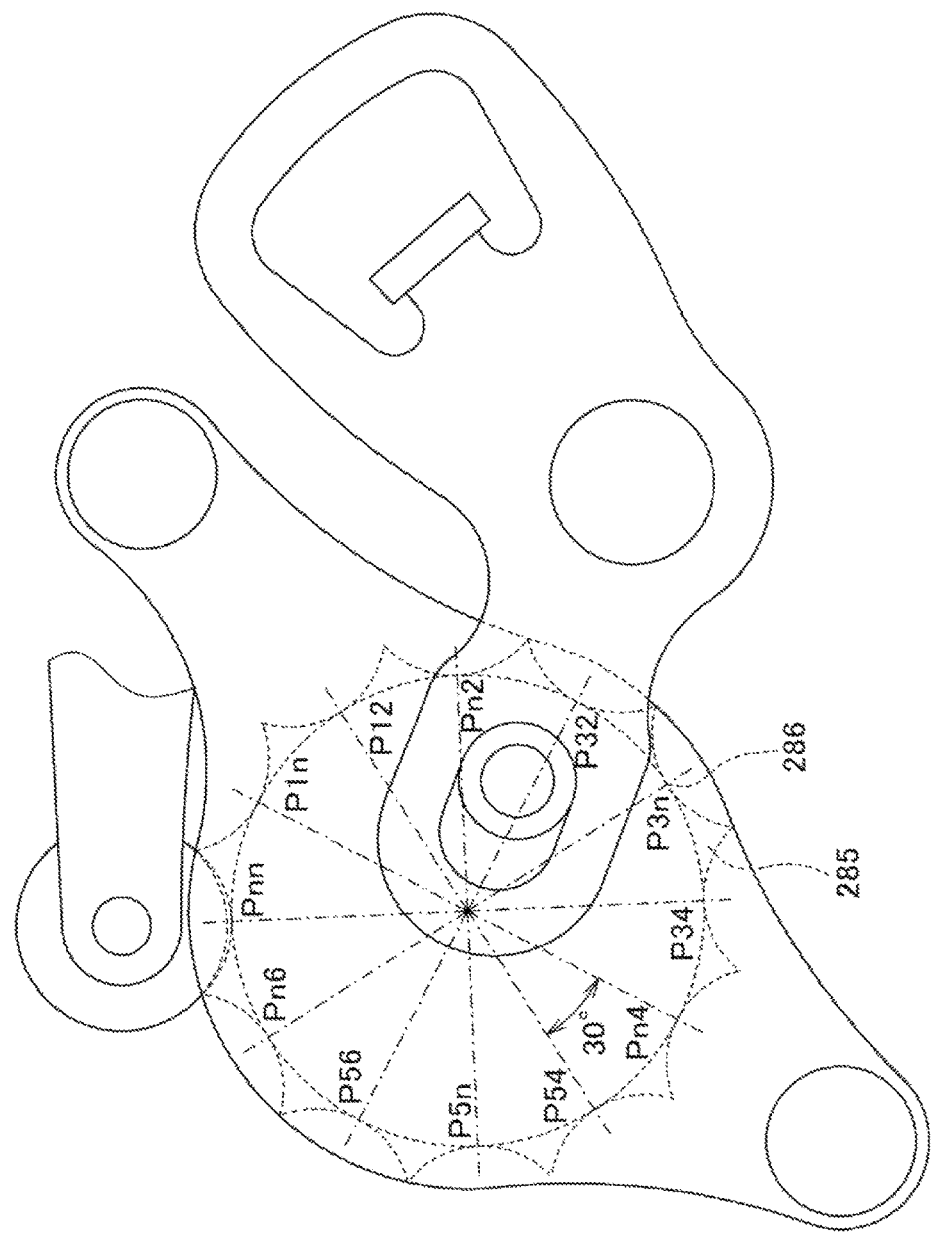
FIG. 20 shows a reference example of a star-shaped cam of a shift drum in a transmission of a six-speed dual clutch type used conventionally.

FIG. 19 shows a reference example of a star-shaped cam 185 of a shift drum 180 in a transmission of a six-speed single clutch type used in the past. FIG. 20 shows a reference example of a star-shaped cam 285 of a shift drum in a transmission of a six-speed dual clutch type used in the past.

As shown in FIG. 19, the star-shaped cam 185 is provided with seven recessed portions 186 corresponding to respective gear positions GP. As for the intervals of the recessed portions 186, there is an angle of 30 degrees from a neutral position Pn to a first speed position P1, and the respective gear positions GP of the first to sixth speed positions P1 to P6 are sequentially arranged at intervals of 60 degrees. In such a past example, the intervals of the gear positions GP are set relatively widely at 60 degrees. Thus, even with a constitution in which the rotational angle of the shift drum 180 is detected by one angle sensor (not shown), the rotational angle of the shift drum 180 can be detected accurately.

However, in the case of the transmission of the dual clutch type as shown in FIG. 20 which transmission has shift stages of six speeds, the number of recessed portions 286 of the star-shaped cam 285 which recessed portions correspond to respective gear positions GP when preparatory positions are included is 12, and the intervals of the gear positions GP are 30 degrees, which is half those of the transmission of the single clutch type. There is thus a limit to detection accuracy in the case of the constitution in which one angle sensor (not shown) detects the rotational angle of the shift drum (not shown). Incidentally, in either case, when an angle sensor having a detection range of 5 V is used, the rotational angle of the shift drum which rotational angle can be controlled per volt of the output voltage is 72 degrees. On the other hand, providing the speed increasing mechanism 90 and using two angle sensors 84 and 94 as in the present embodiment makes it possible to reduce the rotational angle of the shift drum 80 which rotational angle can be controlled per volt of the output voltage, and improve accuracy of detection of the rotational angle of the shift drum 80.

The shift drum angle detecting device 100 according to the embodiment of the present invention described above produces the following effects.

According to the shift drum angle detecting device 100 according to the embodiment of the present invention, the first angle sensor 84 detects the rotational angle of the first sensor shaft 83 rotated integrally with the shift drum 80, and the second angle sensor 94 detects the rotational angle of the second sensor shaft 92 rotated by an amount increased from the amount of rotation of the first sensor shaft 83 at the predetermined speed increasing ratio Ra in the speed increasing mechanism 90.

According to this constitution, the second sensor shaft 92 is rotated by the speed increasing driving gear 91 and the speed increasing driven gear 93 of the speed increasing mechanism 90 by an amount larger than the amount of rotation of the shift drum 80 by a factor of the speed increasing ratio Ra. Thus, even in the case of small intervals of the gear positions GP of the shift drum 80 and small amounts of rotation of the shift drum 80 at times of shift operation, the amount of rotation of the second sensor shaft 92 can be increased. The second angle sensor 94 detects the rotational angle of the second sensor shaft 92 rotated by a large amount. Hence, even in the case of small intervals of the gear positions GP of the shift drum 80, the rotational angle of the shift drum 80 can be detected accurately by using the output value Vout1 of the first angle sensor 84 and the output value Vout2 of the second angle sensor 94.

The star-shaped cam 85 rotated integrally with the shift drum 80 is provided to the front end portion 80a of the shift drum 80. The recessed portions 86 that stop the rotation of the shift drum 80 at the gear positions GP corresponding to the respective shift stages are formed on the outer circumferential surface (not shown) of the star-shaped cam 85, the recessed portions 86 being equal in number to the gear positions GP. The gear positions GP are established when the roller 88a of the detent mechanism 88 abuts against the recessed portions 86 and thereby the rotation of the star-shaped cam 85 is regulated. The speed increasing ratio Ra of the speed increasing mechanism 90 is set at the value of one of divisors of the number of the recessed portions 86 formed on the star-shaped cam 85 other than one.

According to this constitution, when the shift drum 80 is rotated once, the second sensor shaft 92 is rotated the number of times which number is a divisor of the number of gear positions GP, that is, an integral multiple of the number of rotations of the shift drum 80. In addition, the number of areas A each corresponding to one cycle from the minimum value Vmin to the maximum value Vmax of the output value Vout2 of the second angle sensor 94 that detects the rotational angle of the second sensor shaft 92 is the integral multiple. Further, the gear positions GP are evenly disposed in the respective areas A, and the gear positions GP are established. The second angle sensor 94 therefore detects a rotational angle of the shift drum 80 which rotational angle corresponds to one or a plurality of gear positions GP divided into each area A. It is thus possible to facilitate detection of the rotational angle of the shift drum 80 by the second angle sensor 94, and detect the rotational angle of the shift drum 80 accurately.

In the present embodiment, the speed increasing ratio Ra of the speed increasing mechanism 90 is set at "15," which is the same as the number of gear positions GP. The second angle sensor 94 can therefore detect a rotational angle of the shift drum 80 which rotational angle corresponds to one gear position interval within the detection range of one cycle from the minimum value Vmin to the maximum value Vmax of the second angle sensor 94 in which cycle the second sensor shaft 92 is rotated once for each gear position GP. Thus, detection accuracy of the second angle sensor 94 is improved, and therefore the rotational angle of the shift drum 80 can be detected more accurately.

The second angle sensor 94 is connected to the second sensor shaft 92 such that the output value Vout2 output when a gear position GP is established by a recessed portion 86 is the median value Vmid. The median value Vmid corresponds to the middle value between the minimum value Vmin and the maximum value Vmax of the output value Vout2, the minimum value Vmin and the maximum value Vmax being an upper limit value and a lower limit value of detection of the second angle sensor 94. A stable output value Vout2 is obtained even when the positions of the gear positions GP slightly change due to a tolerance or an error. According to this constitution, a rotation of the shift drum 80 is completed at the bottom position 86a of a recessed portion 86, and thereby a gear position GP is established. It is therefore possible to accurately detect completion of a rotation of the shift drum 80 which rotation is ended at the bottom position 86a of a recessed portion 86 of the star-shaped cam 85.

The second angle sensor 94 is connected to the second sensor shaft 92 such that the roller 88a abuts against the vertex 87a of a projecting portion 87 of the star-shaped cam 85 in timing of switching of the output value Vout2 between the maximum value Vmax and the minimum value Vmin.

According to this constitution, the bottom position 86a of a recessed portion 86 where a gear position GP of the shift drum 80 is established is a position most distant from both of a certain switching timing of the output value Vout2 and a next switching timing.

In this timing, the output value Vout2 of the second angle sensor 94 varies greatly. Thus, due to a detection error and effects of hunting of the output value Vout2, the output value Vout2 of the second angle sensor 94 tends to be unstable, so that there is a fear of a decrease in detection accuracy. In detection of the rotational angle of the shift drum 80, a highest accuracy is desired at the bottom positions 86a of the recessed portions 86 of the star-shaped cam 85 at which bottom positions the respective gear positions GP of the shift drum 80 are established. Such a high accuracy is not required at the projecting portions 87 located between the recessed portions 86. Therefore, the switching timing of the output value Vout2 in which timing a decrease in detection accuracy is feared is set away from the bottom positions 86a of the recessed portions 86 at which bottom positions a highest accuracy is desired. The fear of a decrease in detection accuracy can thus be eliminated. Incidentally, this effect is similarly obtained also in constitutions in which the speed increasing ratio Ra of the speed increasing mechanism 90 is not "15," but is set at the values of other divisors of the number of gear positions GP as illustrated in the first modification and the second modification.

Incidentally, in the present embodiment, a transmission of a dog clutch type using dog teeth D is employed as the transmission 31. However, the transmission 31 is not limited to this. Transmissions of other than the dog clutch type can produce similar effects.

In addition, in the present embodiment, a gear system is used in the speed increasing mechanism 90. However, the speed increasing mechanism 90 is not limited to gears. Mechanisms such as a chain system of a chain sprocket and a chain suspended by the chain sprocket, a cog belt system in which cogs are formed on a belt, or the like can be applied to the embodiment of the present invention and can produce similar effects as long as the mechanisms can speed-increase the amount of rotation of the shift drum.

An embodiment and modifications of the present disclosure have been described above with reference to the drawings. However, the embodiment and the modifications are not limited to the contents of the above description, but can be changed without departing from the spirit of the present invention.

According to the embodiment of the present invention, there is provided a shift drum angle detecting device for a transmission, the shift drum angle detecting device being used for the transmission of a constant-mesh type, the transmission including a main shaft supporting a plurality of driving gears and a counter shaft supporting a plurality of driven gears meshing with a plurality of the driving gears, the shift drum angle detecting device including: shift forks engaged with shifter gears of the driving gears and the driven gears; a shift drum having an outer circumferential surface in which lead grooves to which one ends of the shift forks are locked are formed; a first sensor shaft provided to the shift drum and rotated integrally with the shift drum; a first angle sensor detecting a rotational angle of the first sensor shaft; a speed increasing mechanism increasing an amount of rotation of the first sensor shaft at a predetermined speed increasing ratio, the speed increasing mechanism including a speed increasing drive member rotated integrally with the first sensor shaft, a speed increasing driven member driven by the speed increasing drive member and having a diameter smaller than the speed increasing drive member, and a second sensor shaft rotated integrally with the speed increasing driven member; and a second angle sensor detecting a rotational angle of the second sensor shaft, the second angle sensor being provided to the second sensor shaft; a rotational angle of the shift drum being detected by using an output value based on the rotational angle detected by the first angle sensor and an output value based on the rotational angle detected by the second angle sensor.

According to this constitution, the second sensor shaft is rotated more than the amount of rotation of the shift drum by the speed increasing mechanism. Therefore, even in the case of small intervals of the gear positions of the shift drum, the amount of rotation of the second sensor shaft can be increased. The second angle sensor detects the rotational angle of the second sensor shaft rotated by the large amount. Thus, even in the case of small intervals of the gear positions of the shift drum, the rotational angle of the shift drum can be detected accurately by using the output values of the first angle sensor and the second angle sensor.

In the above-described constitution, preferably, the shift drum is provided with a star-shaped cam rotated integrally with the shift drum, a plurality of recessed portions that stop rotation of the shift drum at gear positions corresponding to respective shift stages are formed on an outer circumferential surface of the star-shaped cam alternately with a plurality of projecting portions, a gear position is established when rotation of the star-shaped cam is regulated by abutment of a detent mechanism against a recessed portion, and the speed increasing ratio of the speed increasing mechanism is set at a value of one of divisors of the number of a plurality of the gear positions other than one.

According to this constitution, the speed increasing ratio of the speed increasing mechanism is a divisor of the number of gear positions. Therefore, when the shift drum is rotated once, the second sensor shaft is rotated the number of times which number is the divisor of the number of gear positions. That is, while the shift drum is rotated once, the second sensor shaft is rotated the number of times which number is an integral multiple of the number of rotations of the shift drum. In addition, the number of cycles of the output value of the second angle sensor is set at the divisor, the gear positions are evenly arranged for each cycle, and the gear positions are established. Therefore, the second angle sensor detects the rotational angle of the shift drum which rotational angle corresponds to one or a plurality of gear positions divided into each cycle. It is thus possible to facilitate the detection of the rotational angle of the shift drum by the second angle sensor, and detect the rotational angle of the shift drum accurately.

In the above-described constitution, preferably, the speed increasing ratio of the speed increasing mechanism is set to be the same as the number of the plurality of the gear positions.

According to this constitution, the second sensor shaft is rotated once for each gear position. Therefore, a rotational angle of the shift drum which rotational angle corresponds to one gear position can be detected within the detection range of one cycle. Thus, the detection of the amount of rotation of the second sensor shaft by the second angle sensor can be further facilitated, and because detection accuracy is improved, the rotational angle of the shift drum can be detected with high accuracy.

In the above-described constitution, preferably, the second angle sensor is connected to the second sensor shaft such that the output value output when the gear position is established by the recessed portion is a median value between a minimum value and a maximum value of the output value output from the second angle sensor.

According to this constitution, the output value of the second angle sensor is the median value at a recessed portion of the star-shaped cam which recessed portion is the position where a gear position is established. At the median value, a stable output value is obtained even when accuracy of the position of the gear position is slightly decreased due to a tolerance. Therefore the completion of a rotation of the shift drum which rotation is ended at a recessed portion of the star-shaped cam can be detected reliably.

In the above-described constitution, the output value of the second angle sensor may switch between the minimum value and the maximum value each time the shift drum is rotated by an amount corresponding to one gear position, and the second angle sensor may be connected to the second sensor shaft such that a vertex of a projecting portion of the star-shaped cam abuts against the detent mechanism in timing in which the output value of the second angle sensor switches.

The output value of the sensor in timing of switching between the minimum value and the maximum value varies greatly. In addition, when the output value switches, hunting tends to occur, and the output value tends to be unstable. On the other hand, according to this constitution, the output value in the switching timing is output at a vertex of a projecting portion of the star-shaped cam. In addition, the projecting portion is provided at a middle position between a recessed portion and a recessed portion, and is most distant from the recessed portions that are positions where gear positions are established and at which recessed portions a high detection accuracy of the sensor is desired. Therefore, the switching timing of the output value in which timing a decrease in the detection accuracy is feared is set away from the recessed portions at which a highest accuracy is desired. The fear of a decrease in the detection accuracy can thus be eliminated.

In the above-described constitution in which the speed increasing ratio of the speed increasing mechanism is set at a value of one of the divisors of the number of the plurality of the gear positions other than one, the output value of the second angle sensor may switch between a minimum value and a maximum value each time the shift drum is rotated by an amount corresponding to a plurality of gear positions, and the second angle sensor may be connected to the second sensor shaft such that a vertex of a projecting portion of the star-shaped cam abuts against the detent mechanism in timing in which the output value of the second angle sensor switches.

According to this constitution, a plurality of gear positions are established between the minimum value and the maximum value of the output value of the second angle sensor, and the output value of the second angle sensor in timing in which the output value switches is output at a vertex of a projecting portion of the star-shaped cam. In addition, the projecting portion is provided at a middle position between a recessed portion and a recessed portion, and is most distant from the recessed portions that are positions where a plurality of gear positions are established and at which recessed portions a high detection accuracy of the sensor is desired. Therefore, the switching timing of the output value in which timing a decrease in the detection accuracy is feared is set away from the recessed portions of the star-shaped cam which recessed portions are positions where a plurality of gear positions are established. The fear of a decrease in the detection accuracy can thus be eliminated.

The speed increasing mechanism rotates the second sensor shaft more than the amount of rotation of the shift drum. Therefore, even in the case of small intervals of the gear positions of the shift drum, the amount of rotation of the second sensor shaft can be increased. The second angle sensor detects the rotational angle of the second sensor shaft rotated by the large amount. Thus, even in the case of small intervals of the gear positions of the shift drum, the rotational angle of the shift drum can be detected accurately by using the output values of the first angle sensor and the second angle sensor.

Obviously, numerous modifications and variations of the present invention are possible in light of the above teachings. It is therefore to be understood that within the scope of the appended claims, the invention may be practiced otherwise than as specifically described herein.

What is claimed is:

1. A shift drum angle detecting device for a transmission, the shift drum angle detecting device being used for a constant-mesh transmission, the transmission including a main shaft supporting a plurality of driving gears and a counter shaft supporting a plurality of driven gears meshing with the plurality of the driving gears, the shift drum angle detecting device comprising:
   shift forks engaged with shifter gears of the driving gears and the driven gears;
   a shift drum having an outer circumferential surface in which lead grooves to which one ends of the shift forks are locked are formed;
   a first sensor shaft provided to the shift drum and rotated integrally with the shift drum;

a first angle sensor detecting a rotational angle of the first sensor shaft;

a speed increasing mechanism increasing an amount of rotation of the first sensor shaft at a predetermined speed increasing ratio, the speed increasing mechanism including a speed increasing drive member rotated integrally with the first sensor shaft, a speed increasing driven member driven by the speed increasing drive member and having a diameter smaller than the speed increasing drive member, and a second sensor shaft rotated integrally with the speed increasing driven member; and a second angle sensor detecting a rotational angle of the second sensor shaft, the second angle sensor being provided to the second sensor shaft;

a rotational angle of the shift drum being detected by using an output value based on the rotational angle detected by the first angle sensor and an output value based on the rotational angle detected by the second angle sensor.

2. The shift drum angle detecting device for the transmission according to claim 1, wherein the shift drum is provided with a star-shaped cam rotated integrally with the shift drum, a plurality of recessed portions that stop rotation of the shift drum at gear positions corresponding to respective shift stages are formed on an outer circumferential surface of the star-shaped cam alternately with a plurality of projecting portions, a gear position is established when rotation of the star-shaped cam is regulated by abutment of a detent mechanism against a recessed portion, and the speed increasing ratio of the speed increasing mechanism is set at a value of one of divisors of the number of a plurality of the gear positions other than one.

3. The shift drum angle detecting device for the transmission according to claim 2, wherein the speed increasing ratio of the speed increasing mechanism is set at a same value as the number of the plurality of the gear positions.

4. The shift drum angle detecting device for the transmission according to claim 3, wherein the second angle sensor is connected to the second sensor shaft such that the output value output by the second angle sensor when the gear position is established by the recessed portion is a median value between a minimum value and a maximum value of the output value output from the second angle sensor.

5. The shift drum angle detecting device for the transmission according to claim 4, wherein the output value of the second angle sensor switches between the minimum value and the maximum value each time the shift drum is rotated by an amount corresponding to one gear position, and the second angle sensor is connected to the second sensor shaft such that a vertex of a projecting portion of the star-shaped cam abuts against the detent mechanism in timing in which the output value of the second angle sensor switches.

6. The shift drum angle detecting device for the transmission according to claim 2, wherein the output value of the second angle sensor switches between a minimum value and a maximum value each time the shift drum is rotated by an amount corresponding to a plurality of gear positions, and the second angle sensor is connected to the second sensor shaft such that a vertex of a projecting portion of the star-shaped cam abuts against the detent mechanism in timing in which the output value of the second angle sensor switches.

7. A shift drum angle detecting device for a transmission, comprising:

shift forks engaged with shifter gears of driving gears and driven gears, the transmission including a main shaft which supports the driving gears and including a counter shaft which supports the driven gears meshing with the driving gears;

a shift drum having an outer circumferential surface having lead grooves with which one ends of the shift forks are engaged;

a first sensor shaft provided to the shift drum to be rotated with the shift drum;

a first angle sensor to detect a rotational angle of the first sensor shaft to output a first output value based on the rotational angle;

a speed increasing mechanism to increase an amount of rotation of the first sensor shaft at a predetermined speed increasing ratio, the speed increasing mechanism comprising:

a speed increasing drive member to be rotated with the first sensor shaft;

a speed increasing driven member to be rotated by the speed increasing drive member, the speed increasing driven member having a diameter smaller than a diameter of the speed increasing drive member; and a second sensor shaft to be rotated with the speed increasing driven member; and a second angle sensor provided to the second sensor shaft to detect a rotational angle of the second sensor shaft and to output a second output value based on the rotational angle of the second sensor shaft, a rotational angle of the shift drum being to be detected based on the first output value output from the first angle sensor and the second output value output from the second angle sensor.

8. The shift drum angle detecting device according to claim 7, wherein the shift drum is provided with a star-shaped cam to be rotated with the shift drum, wherein recessed portions that stop rotation of the shift drum at gear positions corresponding to respective shift stages are provided on an outer circumferential surface of the star-shaped cam alternately with projecting portions, wherein a gear position among the gear positions is established when rotation of the star-shaped cam is regulated by abutment of a detent mechanism against a recessed portion among the recessed portions, and wherein the predetermined speed increasing ratio of the speed increasing mechanism is set at a value of one of divisors of a total number of the gear positions other than one.

9. The shift drum angle detecting device according to claim 8, wherein the predetermined speed increasing ratio of the speed increasing mechanism is set at a same value as the total number of the gear positions.

10. The shift drum angle detecting device according to claim 9, wherein the second angle sensor is connected to the second sensor shaft such that the second output value output when the gear position is established by the recessed portion is a median value between a minimum value and a maximum value of the second output value output from the second angle sensor.

11. The shift drum angle detecting device according to claim 10,
wherein the second output value of the second angle sensor switches between the minimum value and the maximum value each time the shift drum is rotated by an amount corresponding to one gear position, and
wherein the second angle sensor is connected to the second sensor shaft such that a vertex of a projecting portion among the projecting portions of the star-shaped cam abuts against the detent mechanism in timing in which the second output value of the second angle sensor switches.

12. The shift drum angle detecting device according to claim 8,
wherein the second output value of the second angle sensor switches between a minimum value and a maximum value each time the shift drum is rotated by an amount corresponding to a plurality of gear positions, and
wherein the second angle sensor is connected to the second sensor shaft such that a vertex of a projecting portion among the projecting portions of the star-shaped cam abuts against the detent mechanism in timing in which the second output value of the second angle sensor switches.

13. The shift drum angle detecting device according to claim 7,
wherein the first output value of the first angle sensor is a minimum value when the shift drum is in an imaginary reference state,
wherein the first output value of the first angle sensor is a maximum value when the shift drum has been rotated by 360 degrees from the imaginary reference state, and
wherein the first output value of the first angle sensor linearly changes between the minimum value and the maximum value.

14. The shift drum angle detecting device according to claim 11,
wherein the second output value of the second angle sensor linearly changes between the minimum value and the maximum value.

15. A shift drum angle detecting device for a transmission, the shift drum angle detecting device comprising:
shift forks engaged with shifter gears of a plurality of driving gears supported on a main shaft and a plurality of driven gears supported on a counter shaft;
a shift drum having an outer circumferential surface in which lead grooves to which one ends of the shift forks are locked are formed;
a first sensor shaft provided to the shift drum that is configured to rotate integrally with the shift drum;
a first angle sensor configured to detect a rotational angle of the first sensor shaft;
a speed increasing mechanism configured to increase an amount of rotation of the first sensor shaft at a predetermined speed increasing ratio, the speed increasing mechanism including
a speed increasing drive member that is configured to rotate integrally with the first sensor shaft,
a speed increasing driven member configured to be driven by the speed increasing drive member and having a diameter smaller than the speed increasing drive member, and
a second sensor shaft configured to rotate integrally with the speed increasing driven member; and
a second angle sensor configured to detect a rotational angle of the second sensor shaft, the second angle sensor being provided to the second sensor shaft,
a rotational angle of the shift drum being detected by using an output value based on the rotational angle detected by the first angle sensor and an output value based on the rotational angle detected by the second angle sensor.

16. The shift drum angle detecting device for the transmission according to claim 15,
wherein the shift drum is provided with a star-shaped cam rotated integrally with the shift drum,
a plurality of recessed portions that stop rotation of the shift drum at gear positions corresponding to respective shift stages are formed on an outer circumferential surface of the star-shaped cam alternately with a plurality of projecting portions,
a gear position is established when rotation of the star-shaped cam is regulated by abutment of a detent mechanism against a recessed portion, and
the speed increasing ratio of the speed increasing mechanism is set at a value of one of divisors of the number of a plurality of the gear positions other than one.

17. The shift drum angle detecting device for the transmission according to claim 16,
wherein the speed increasing ratio of the speed increasing mechanism is set at a same value as the number of the plurality of the gear positions.

18. The shift drum angle detecting device for the transmission according to claim 17,
wherein the second angle sensor is connected to the second sensor shaft such that the output value output by the second angle sensor when the gear position is established by the recessed portion is a median value between a minimum value and a maximum value of the output value output from the second angle sensor.

19. The shift drum angle detecting device for the transmission according to claim 18,
wherein the output value of the second angle sensor switches between the minimum value and the maximum value each time the shift drum is rotated by an amount corresponding to one gear position, and
the second angle sensor is connected to the second sensor shaft such that a vertex of a projecting portion of the star-shaped cam abuts against the detent mechanism in timing in which the output value of the second angle sensor switches.

20. The shift drum angle detecting device for the transmission according to claim 16,
wherein the output value of the second angle sensor switches between a minimum value and a maximum value each time the shift drum is rotated by an amount corresponding to a plurality of gear positions, and
the second angle sensor is connected to the second sensor shaft such that a vertex of a projecting portion of the star-shaped cam abuts against the detent mechanism in timing in which the output value of the second angle sensor switches.

* * * * *